(12) United States Patent
Zheng et al.

(10) Patent No.: US 11,184,542 B2
(45) Date of Patent: Nov. 23, 2021

(54) PHOTOGRAPHING APPARATUS CONTROL METHOD, PHOTOGRAPHING APPARATUS AND STORAGE MEDIUM

(71) Applicant: SZ DJI TECHNOLOGY CO., LTD., Shenzhen (CN)

(72) Inventors: Yayun Zheng, Shenzhen (CN); Linglong Zhu, Shenzhen (CN); Fen Chen, Shenzhen (CN); Dan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/833,083

(22) Filed: Mar. 27, 2020

(65) Prior Publication Data
US 2020/0228727 A1    Jul. 16, 2020

Related U.S. Application Data

(63) Continuation of application No. PCT/CN2017/104826, filed on Sep. 30, 2017.

(51) Int. Cl.
*H04N 5/232* (2006.01)
*H04N 5/235* (2006.01)
*H04N 5/93* (2006.01)

(52) U.S. Cl.
CPC ... *H04N 5/232939* (2018.08); *H04N 5/23212* (2013.01); *H04N 5/23216* (2013.01); *H04N 5/23245* (2013.01); *H04N 5/232933* (2018.08)

(58) Field of Classification Search
CPC ....... H04N 5/232939; H04N 5/232933; H04N 5/23212; H04N 5/23216; H04N 5/23245;
(Continued)

(56) References Cited

U.S. PATENT DOCUMENTS 8,063,945 B2 * 11/2011 Hoshino ............ H04N 5/23293
348/222.1
2011/0076003 A1    3/2011 Cho et al.
(Continued)

FOREIGN PATENT DOCUMENTS

CN    1801890 A    7/2006
CN    101098403 A    1/2008
(Continued)

OTHER PUBLICATIONS

The World Intellectual Property Organization (WIPO) International Search Report for PCT/CN2017/104826 dated Jun. 22, 2018 7 pages.
(Continued)

*Primary Examiner* — Albert H Cutler
(74) *Attorney, Agent, or Firm* — Anova Law Group, PLLC

(57) ABSTRACT

A method for controlling a photographing apparatus with a display screen includes detecting a sliding operation on the display screen and switching a display interface in response to the sliding operation. If the sliding operation is a first operation mode, the display interface is switched to a photographing mode setting interface. If the sliding operation is a second operation mode, the display interface is switched to a photographing function setting interface. If the sliding operation is a third operation mode, the display interface is switched to a playback control interface.

20 Claims, 25 Drawing Sheets

```
┌─────────────────────────────────────────────┐  ╱── S10
│ Detect a sliding operation of a user on a    │ ╱
│ display screen                               │╱
└─────────────────────────────────────────────┘
                      │
                      │
┌─────────────────────────────────────────────┐  ╱── S12
│ Switch a display interface in response to    │ ╱
│ the sliding operation                        │╱
└─────────────────────────────────────────────┘
```

(58) Field of Classification Search
CPC .... H04N 5/23293; H04N 5/2353; H04N 5/93; H04N 5/232935
USPC ........................................ 348/333.01–333.13
See application file for complete search history.

(56) References Cited

U.S. PATENT DOCUMENTS

| | | | |
|---|---|---|---|
| 2011/0242395 A1* | 10/2011 | Yamada | H04N 5/232 348/333.02 |
| 2014/0192244 A1* | 7/2014 | Ishihara | H04N 5/2252 348/333.02 |
| 2017/0099437 A1 | 4/2017 | Mehta et al. | |
| 2017/0187954 A1* | 6/2017 | Fukuya | H04N 5/23216 |
| 2019/0058828 A1* | 2/2019 | Russi-Vigoya | H04N 5/232935 |

FOREIGN PATENT DOCUMENTS

| | | |
|---|---|---|
| CN | 104216525 A | 12/2014 |
| CN | 104731499 A | 6/2015 |
| CN | 105100631 A | 11/2015 |
| CN | 303572691 S | 1/2016 |
| EP | 3190782 A2 | 7/2017 |

OTHER PUBLICATIONS

Anonymous: "Osmo Mobile User Manual", Mar. 17, 2017, pp. 1-21 https://dl.djicdn.com/downloads/osmo+mobile/20170317/Osmo+Mobile+User+Manual+V1.2+(EN).pdf.
Gopro: "GoPro Hero 5 Back Manual", Jan. 23, 2017 https://gopro.com/content/dam/help/hero5-black/manuals/HERO5Black_UM_ENG_REVC_Web.pdf.

* cited by examiner

PHOTOGRAPHING APPARATUS CONTROL METHOD, PHOTOGRAPHING APPARATUS AND STORAGE MEDIUM

CROSS-REFERENCE TO RELATED APPLICATION

This application is a continuation of International Application No. PCT/CN2017/104826, filed Sep. 30, 2017, the entire content of which is incorporated herein by reference.

TECHNICAL FIELD

The present disclosure relates to the photograph control field, and more particularly, to a photographing apparatus control method, photographing apparatus, and storage medium.

BACKGROUND

At present, there are a variety of camera products on the market that people can use to record and save every bit of life, and images and pictures that need attention. The cameras usually provide a display interface and physical buttons for human-computer interaction. For example, during setting photographing parameters, a user needs to refer to the parameter display content of the display interface and continuously press the physical buttons to set the photographing parameters. On the one hand, with the development of technology, people have become used to performing operation settings directly on the display interface, e.g., by sliding the screen of a mobile phone to achieve the corresponding operation purpose. Therefore, it has become an urgent problem how to control the camera directly through the camera's display interface. On the other hand, miniaturization has become one of the directions for the development of cameras. People prefer to have a compact and lightweight camera for easy carrying, in which case, too many keys on the camera will also limit the development of camera miniaturization.

A method for controlling a photographing apparatus, a photographing apparatus, and a storage medium are needed.

It should be noted that the information disclosed in this background is only used to enhance the understanding of the background of the present disclosure, and may include information that does not constitute the existing technologies known to those skilled in the art.

SUMMARY

In accordance with the disclosure, there is provided a method for controlling a photographing apparatus with a display screen and a gimbal. The method includes detecting a sliding operation on the display screen and switching a display interface in response to the sliding operation. If the sliding operation is a first operation mode, the display interface is switched to a photographing mode setting interface. If the sliding operation is a second operation mode, the display interface is switched to a photographing function setting interface. If the sliding operation is a third operation mode, the display interface is switched to a playback control interface.

Also in accordance with the disclosure, there is provided a photographing apparatus including a camera configured to acquire images, a display body including a display screen configured to display the images acquired by the camera, a gimbal configured to support a camera and drive the camera to rotate around at least one axis and being in communication with the display body, a processor, and a memory storing instructions that, when executed by the processor, cause the processor to detect a sliding operation on the display screen and switch a display interface in response to the sliding operation. If the sliding operation is a first operation mode, the display interface is switched to a photographing mode setting interface. If the sliding operation is a second operation mode, the display interface is switched to a photographing function setting interface. If the sliding operation is a third operation mode, the display interface is switched to a playback control interface.

DETAILED DESCRIPTION OF THE EMBODIMENTS

Figure 1:
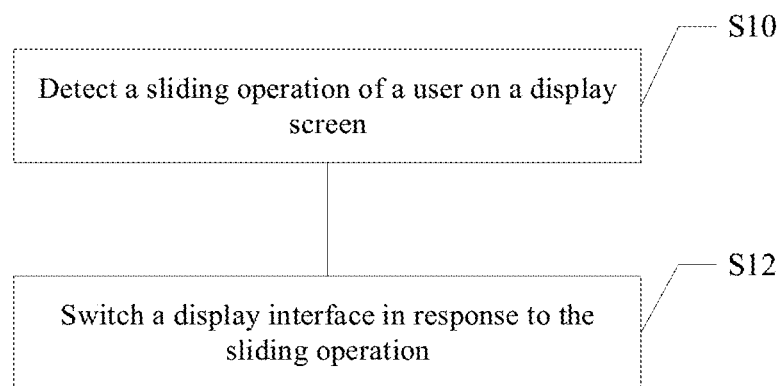
FIG. 1 is a flowchart of a method for controlling a photographing apparatus according to one embodiment of the present disclosure.

Technical solutions of the present disclosure will be described in detail with reference to the drawings. The example embodiments can be implemented in various forms and should not be construed as limited to the examples set forth herein. Rather, the embodiments are provided so that this disclosure will be more comprehensive and complete, and the concepts of the example embodiments will be fully conveyed to those skilled in the art. The described features, structures, or characteristics may be combined in any suitable method in one or more embodiments. Many specific details are provided to give a full understanding of the embodiments of the present disclosure. Those skilled in the art will realize that the technical solutions of the present disclosure may be practiced without omitting one or more of the specific details, or other methods, components, devices, steps, etc. may be adopted.

The drawings are merely schematic illustrations of the present disclosure and are not necessarily drawn to scale. The same reference numerals in the drawings represent the same or similar parts, and repeated descriptions thereof may be omitted. Some block diagrams shown in the figures are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The flowcharts shown in the drawings are only for illustration, and are not necessary to include all steps. For example, some steps can be divided, and some steps can be merged or partially merged, so the order of actual execution may be changed according to the actual situation.

The photographing apparatus control method will be described below with reference to a camera. It should be noted that one or more of the control methods, interface operation methods, interface display methods, or human-computer interaction methods described below can also be applied to fields other than photographing, such as control operations on a workbench with a touch screen, and layout of the application display interface of a smart terminal (e.g., mobile phone, tablet, etc.), etc.

FIG. 1 schematically illustrates a photographing apparatus control method according to one embodiment of the present disclosure. The photographing apparatus according to the present disclosure has a display screen, and the display screen is a touch screen so as to respond to a touch operation performed by a finger or a stylus. As shown in FIG. 1, the photographing apparatus control method includes the following.

At S10, a sliding operation of a user on a display screen is detected.

At S12, a display interface is switched in response to the sliding operation.

In the embodiments of the present disclosure, the sliding operation of the user on the display screen may be in one of a first operation mode, a second operation mode, a third operation mode, and a fourth operation mode. A corresponding relationship can be established between the operation mode and the display interface. Specifically, if the sliding operation is in the first operation mode, the display interface is switched to a photographing mode setting interface. If the sliding operation is in the second operation mode, the display interface is switched to a photographing function setting interface. If the sliding operation is in the third operation mode, the display interface is switched to a playback control interface. If the sliding operation is in the fourth operation mode, the display interface is switched to a photographing apparatus parameter setting interface.

According to some embodiments of the present disclosure, the first operation mode may be a sliding operation from upper to lower, the second operation mode may be a sliding operation from lower to upper, the third operation mode may be a sliding operation from left to right, and the fourth operation mode may be a sliding operation from right to left.

In some embodiments, the operation mode and the actual sliding operation of the user are not limited to the corresponding relationship described above. For example, the first operation mode may also be a sliding operation from right to left, in which case the fourth operation mode may be a sliding operation from upper to lower. On the other hand, the operation modes described in this disclosure are not limited to the above four operation modes, and the operation modes may also include, e.g., a sliding operation from lower left to upper right, a sliding operation from upper left to lower right, a sliding operation from upper right to lower left, or a sliding operation from lower right to upper left, etc.

By detecting the sliding operation of the user on the display, the operation mode is determined according to the sliding operation, and the display interface switching process corresponding to the operation mode is performed. In this embodiment, a control by physical buttons is not needed, and the user can perform the display interface switching only by sliding operation, which is simple and convenient. Further, since the number of physical buttons on the camera can be reduced, the method helps to miniaturize the camera for users to carry around.

A specific process of the photographing apparatus control method according to one embodiment of the present disclosure and operation control of each interface is illustrated as follows.

Figure 2:
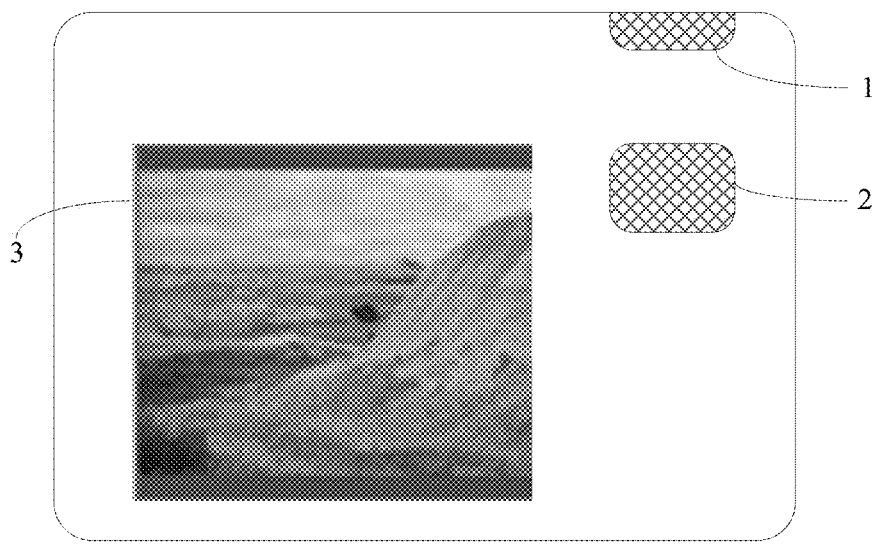
FIG. 2 is a schematic diagram showing a framing interface according to one embodiment of the present disclosure.

FIG. 2 shows a schematic diagram of a human-computer interaction panel of a photographing apparatus according to one embodiment of the present disclosure. As shown in FIG. 2, the human-computer interaction panel includes a first control button 1, a second control button 2, and an interface display area 3.

In some embodiments, the first control button 1 and the second control button 2 may respond to a pressing operation of a user to perform corresponding operations in different interfaces. For example, the first control button 1 can perform at least one of the operations of returning to the real-time framing interface, starting photographing, stopping photographing, and photographing using a default track and configuration. The second control button 2 can perform at least one of the operations of returning to the real-time framing interface, returning to the previous operation interface, trigger, returning to the position setting interface and clearing all set positions, starting photographing, and stopping photographing. The functions of the first control button 1 and the second control button 2 are not limited to those described above. A system developer can define button functions for different interfaces. The user can also set the functions of the two buttons, which is not particularly limited in this embodiment.

The interface exemplarily displayed in the interface display area 3 in FIG. 2 is a real-time framing interface. The relative positions of the first control button 1, the second control button 2, and the interface display area 3 shown in the figure are only for illustration purpose and can be changed under the condition that convenient watching and operation of the user are ensured.

Figure 3:
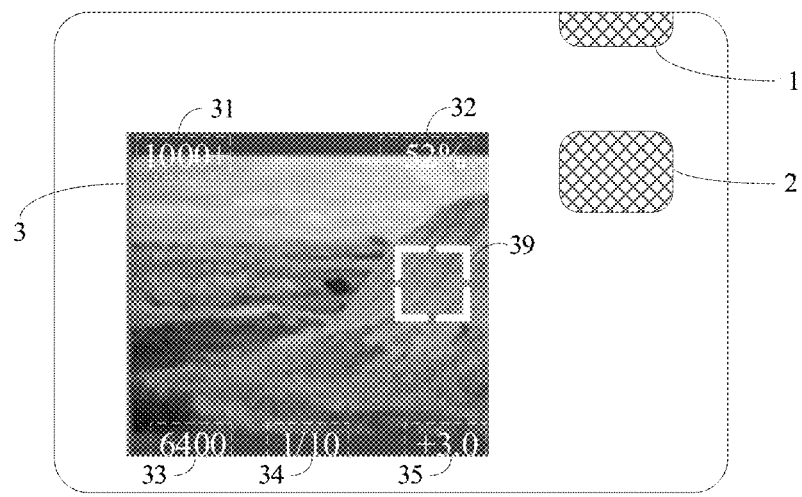
FIG. 3 is a schematic diagram showing a framing interface while a picture is taken in a case of a half-press shutter operation according to one embodiment of the present disclosure.

As shown in FIG. 3, if the photographing apparatus is in the manual mode (M mode), when the user presses the shutter button halfway, one or more of a display area 31 for the remaining number of photos that can be taken (remaining photo number display area), a display area 32 for the power (power display area), a display area 33 for the photosensitivity (ISO) (ISO display area), a display area 34 for the shutter speed (shutter speed display area), or a display area 35 for the exposure compensation (exposure compensation display area) can be displayed in the real-time framing interface.

For the remaining number of photos that can be taken, the developer can set a predetermined threshold n of the number of photos. When the remaining number of photos that can be taken by the camera is greater than the predetermined threshold n, it is displayed as n+ in the remaining photo number display area 31. In the embodiment of FIG. 3, the predetermined threshold n of the number of photos is 1000, so it is displayed as 1000+ in the remaining photo number display area 31. Displaying the remaining number of photos that can be taken in this way is intuitive and has a small display area. On the other hand, in the case where the display area is sufficient, the remaining number of photos that can be taken can also be displayed in a text form in the area 31. For example, "Number of remaining photos sufficient," or "Number of remaining photos insufficient," etc. can be displayed in the area 31.

For the power display, the developer can set a first power threshold. If the power of the photographing apparatus is less than the first power threshold, the power of the photographing apparatus is constantly displayed in the display area of the power 32. Further, if the power of the photographing apparatus is greater than or equal to the first power threshold, the power of the photographing apparatus is displayed in a first color, and if the power of the photographing apparatus is less than the first power threshold, the power of the photographing apparatus is displayed in a second color. For example, the first power threshold can be set as 10%, the first color can be set as green, and the second color can be set as yellow. When the power of the photographing apparatus is greater than or equal to 10%, the power of the photographing apparatus is displayed in green in the display area of the power 32. When the power of the photographing apparatus is less than 10%, the power of the photographing apparatus is displayed in yellow in the display area of the power 32, and the power is constantly displayed.

In some embodiments, the developer may further set a second power threshold, and when the power of the photographing apparatus is less than the second power threshold, the power of the photographing apparatus may be displayed in a predetermined pattern. For example, the second power threshold may be set as 5%, and the predetermined pattern may be displayed in flashing red. That is, when the power of the photographing apparatus is less than 5%, the power of the photographing apparatus is displayed in flashing red in the display area of the power 32, so as to effectively remind the user to charge or replace the battery.

In the example shown in FIG. 3, the photosensitivity displayed in the ISO display area 33 is 6400, the shutter speed displayed in the shutter speed display area 34 is ⅒, and the exposure compensation displayed in the exposure compensation display area 35 is +3.0. It should be noted that the specific values shown in FIG. 3 are only illustrative descriptions, and the present disclosure is not limited thereto.

In some embodiments, the interface displayed in the interface display area 3 is a real-time framing interface and can display a tracking frame or a metering-focusing frame in response to a half-press shutter operation of the user in the photographing mode. FIG. 3 schematically illustrates the metering-focusing frame 39. The pattern of the tracking frame is different from that of the metering-focusing frame 39. For example, the wireframe thickness, aspect ratio, and display color of the tracking frame can be different from the wireframe thickness, aspect ratio, and display color of the metering-focusing frame 39.

When the tracking function is off, in response to a click operation of the user on the real-time framing interface, the metering-focusing frame can be displayed at the click. Further, the metering-focusing frame may be configured to reduce transparency after the first predetermined time, and disappear after the exposure value changes by more than 1 or after a second predetermined time. After the focusing frame disappears, global focusing and global average metering are performed by default. Specifically, the first predetermined time can be set as 1 s and the second predetermined time can be set as 3 s. The first and second predetermined times can also be set as other times.

In some embodiments, when the metering-focusing frame is displayed, the user can press and hold a lock control (e.g., AE/AF lock button) to lock the metering-focusing frame and display the lock mark. The transparency of the lock mark is reduced after a third predetermined time. For example, the third predetermined time may be set as 1 s. Further, the user can click the area other than the metering-focusing frame on the real-time framing interface, and the system responds to this operation to unlock the metering-focusing frame.

In some embodiments, the color of the metering-focusing frame can change depending on whether the focusing is successful. For example, when focusing is successful, the color of the focus frame can change to green. The color of the tracking frame can also change depending on whether the tracking is successful. For example, when the tracking is successful, the tracking frame can turn green, and when the object is lost, the tracking frame can turn red.

In addition, when the user does not perform the confirmation operation for the tracking frame and the metering-focusing frame before photographing, the system can perform the global focusing and global average metering by default.

Figure 4:
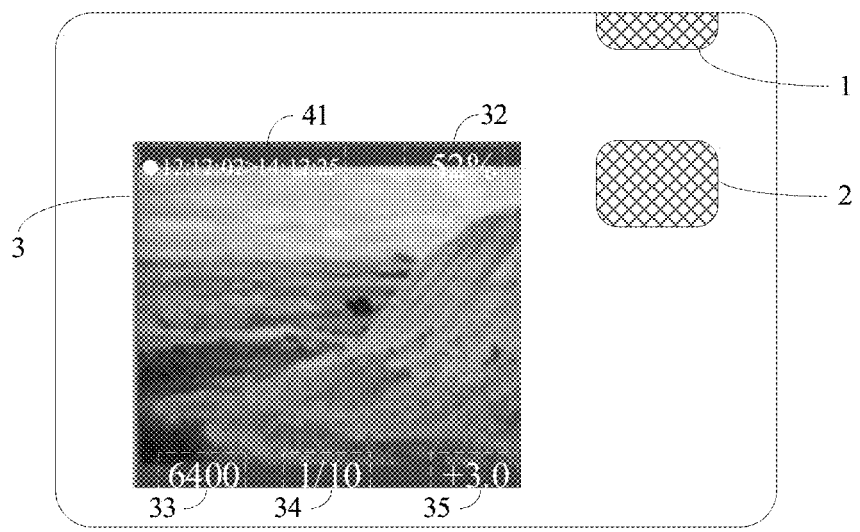
FIG. 4 is a schematic diagram showing a framing interface during video recording according to an embodiment of the present disclosure.

FIG. 4 is a schematic diagram showing a real-time framing interface during a video recording. As shown in FIG. 4, in the video recording mode, in addition to the power display area 32, the ISO display area 33, shutter speed display area 34 and the exposure compensation display area 35, the real-time framing interface can further display a display area 41 for video recording status prompt information (video recording status prompt information display area). The video recording status prompt information may include a current recording time and/or a remaining recording time. As shown in FIG. 4, the current recording time is, e.g., 12:12:02, and the remaining recording time is, e.g., 14:12: 25. The video recording status prompt information display area 41 may further include a video recording status indicator, which is, e.g., in color of white before the recording starts and turns to, e.g., red after the recording starts, so as to visually distinguish whether a video recording is currently performed.

In some embodiments, when the user performs the sliding operation on the display screen from lower to upper, that is, when the second operation mode is performed, the interface displayed in the interface display area 3 is switched to a photographing function setting interface. When the photographing apparatus is in the photographing mode, if storage is normal, the display interface can be switched to the photographing function setting interface in response to the sliding operation from lower to upper of the user, and the photographing function setting interface displays the storage capacity parameter.

Figure 5:
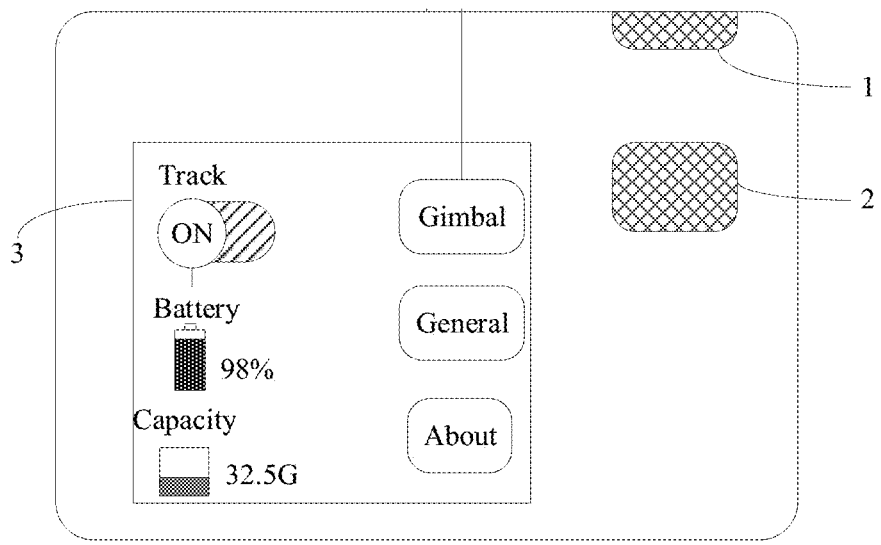
FIG. 5 is a schematic diagram showing a photographing function setting interface according to one embodiment of the present disclosure.

As shown in FIG. 5, the photographing function setting interface includes a tracking switch control, a display of the power, a display of the capacity, a gimbal setting control, a general setting control, and other-parameter setting controls. Other commonly used controls can further be integrated on the photographing setting interface to facilitate the user to perform the photographing function settings, and the disclosure is not limited thereto.

Specifically, the user can use the tracking switch control to enable or disable a tracking mode. The user can visually check the power status and storage capacity of the photographing apparatus. The power can be displayed as a percentage. The capacity can be displayed in terms of a remaining storage capacity. When the capacity is greater than or equal to 1 GB, the remaining capacity can be displayed in GB. When the capacity is less than 1 GB, the remaining capacity can be displayed in MB. The user can click the gimbal setting control, and the interface is switched to a configuration interface related to the gimbal setting for the user to set the gimbal. The user can click the general setting control, and the interface is switched to a configuration interface related to the general information for the user to configure the general information. The user can click an ABOUT control, and the interface is switched to other function configuration interface for the user to configure other function parameters.

As shown in FIG. 5, when the interface displayed in the interface display area 3 is a photographing function setting interface, the function of the second control button 2 is configured to return to the real-time framing interface, that is, when the user presses the second control button 2, the interface in the interface display area 3 is switched to the real-time framing interface.

According to the present disclosure, there is provided a processing method to solve possible storage problems of the photographing apparatus.

Figure 6:
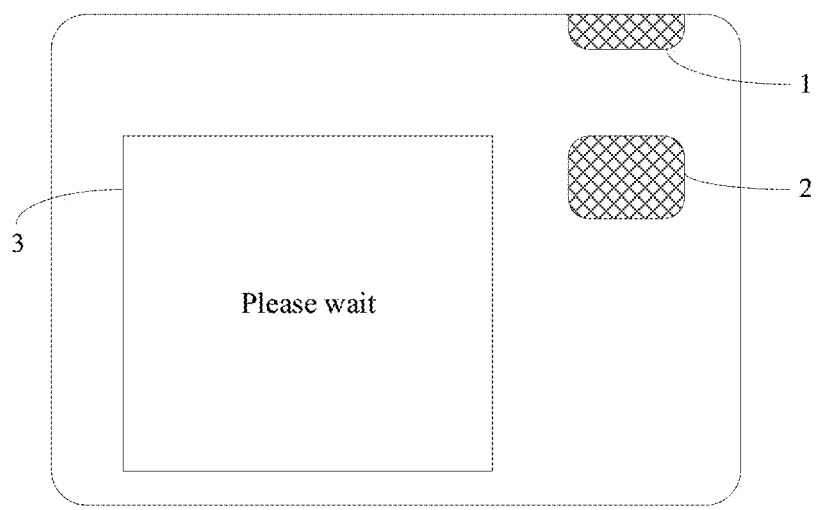
FIGS. 6-15 are schematic diagrams showing display interfaces of ten storage problems according to one embodiment of the present disclosure.

In the case that a video is under repair, the display interface in the interface display area 3 is switched to a corresponding text prompt interface. As shown in FIG. 6, the text prompt interface displays "Please wait," in which case, the shutter and the return button are disabled until the video repair is done. The power button of the photographing apparatus can be used.

In some embodiments, the shutter button may be the first control button 1, and the return button may be the second control button 2.

Figure 7:
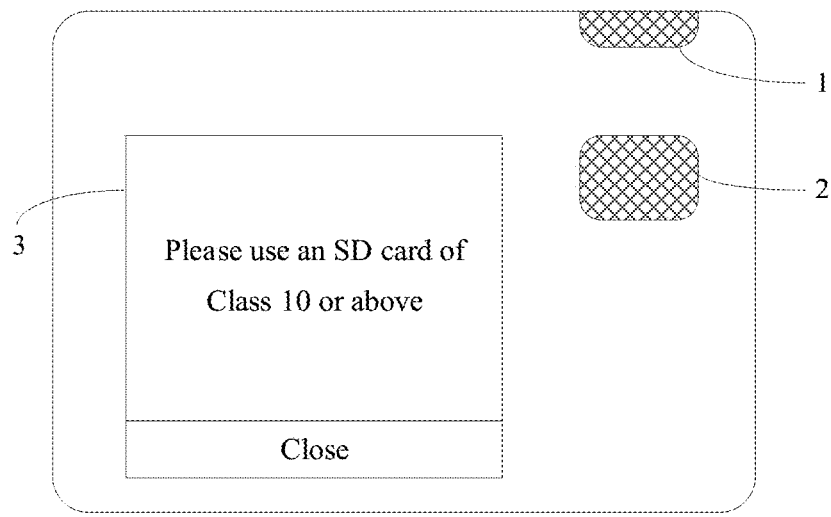

In the case that the storage is set as SD card storage but a low-speed SD card is currently used, when the photographing apparatus is turned on, a text prompt interface corresponding to the problem is displayed in the interface display area 3. As shown in FIG. 7, the text prompt interface displays "Please use an SD card of Class 10 or above." Further, a close button is configured at the bottom of the text prompt interface and can be clicked by the user to exit the text prompt interface, and hence the photographing apparatus can be used normally. When the text prompt interface is displayed, the functions of the shutter and the return button can be set as turning off the display screen.

Figure 8:
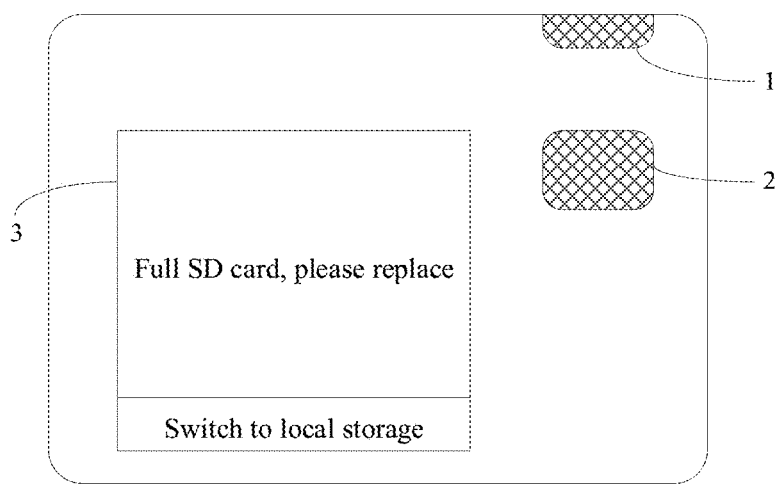

In the case that the storage is set as SD card storage but the SD card is full, the display interface may display a text prompt interface corresponding to the problem. As shown in FIG. 8, The text prompt interface displays "SD card full, please replace." Further, a switch button for switching to local storage is configured at the bottom of the text prompt interface so that the user can set the storage as local storage after clicking. The shutter and the return button are disabled and the power button of the photographing apparatus can be used in this case. The photographing apparatus can be used normally after the SD card is replaced or after it is switched to local storage.

Figure 9:
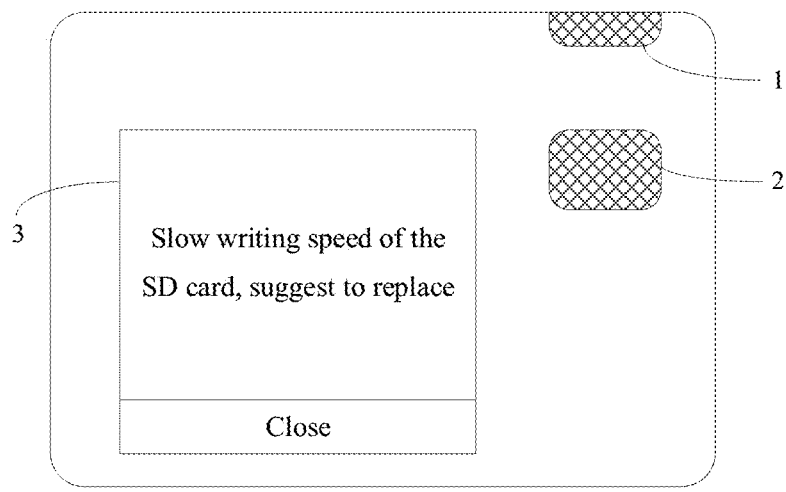

In the case that the storage is set as SD card storage but the SD card writes slowly, when the photographing apparatus is turned on, a text prompt interface corresponding to the problem is displayed in the interface display area 3. As shown in FIG. 9, the text prompt interface displays "SD card writing speed slow, suggest to replace." Further, a close button is configured at the bottom of the text prompt interface and can be clicked by the user to exit the text prompt interface, and hence the photographing apparatus can be used normally. When the text prompt interface is displayed, the functions of the shutter and the return button can be set as turning off the display screen.

Figure 10:
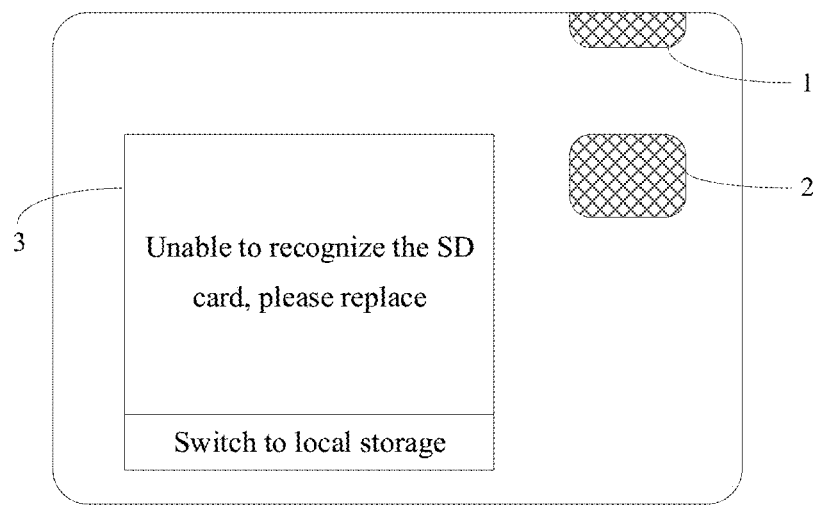

In the case that the storage is set as SD card storage but the SD card cannot be recognized, when the photographing apparatus is turned on, a text prompt interface corresponding to the problem is displayed in the interface display area 3. As shown in FIG. 10, the text prompt interface displays "Unable to recognize the SD card, please replace." Further, a switch button for switching to local storage is configured at the bottom of the text prompt interface so that the user can set the storage as local storage after clicking. The shutter and the return button are disabled and the power button of the photographing apparatus can be used in this case. The photographing apparatus can be used normally after the SD card is replaced or after it is switched to local storage.

Figure 11:
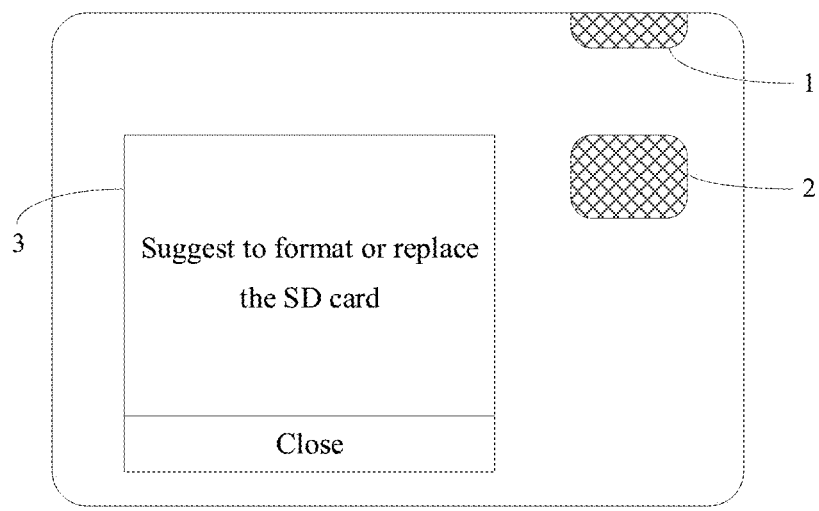

In the case that the storage is set as SD card storage but the SD card cluster is abnormal, when the photographing apparatus is turned on, a text prompt interface corresponding to the problem is displayed in the interface display area 3. As shown in FIG. 11, the text prompt interface displays "Suggest to format or replace the SD card." Further, a close button is configured at the bottom of the text prompt interface and can be clicked by the user to exit the text prompt interface, and hence the photographing apparatus can be used normally.

Figure 12:
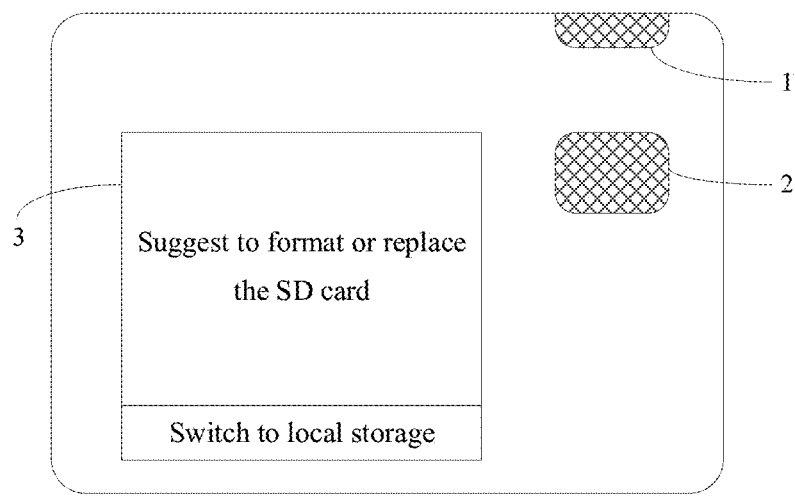

In the case that the storage is set as SD card storage but the SD card number overflows, the display interface displays a text prompt interface corresponding to the problem. As shown in FIG. 12, the text prompt interface displays "Suggest to format or replace the SD card." Further, a switch button for switching to local storage is configured at the bottom of the text prompt interface so that the user can set the storage as local storage after clicking. The shutter and the return button are disabled and the power button of the photographing apparatus can be used in this case. The photographing apparatus can be used normally after the SD card is replaced or after it is switched to local storage.

Figure 13:
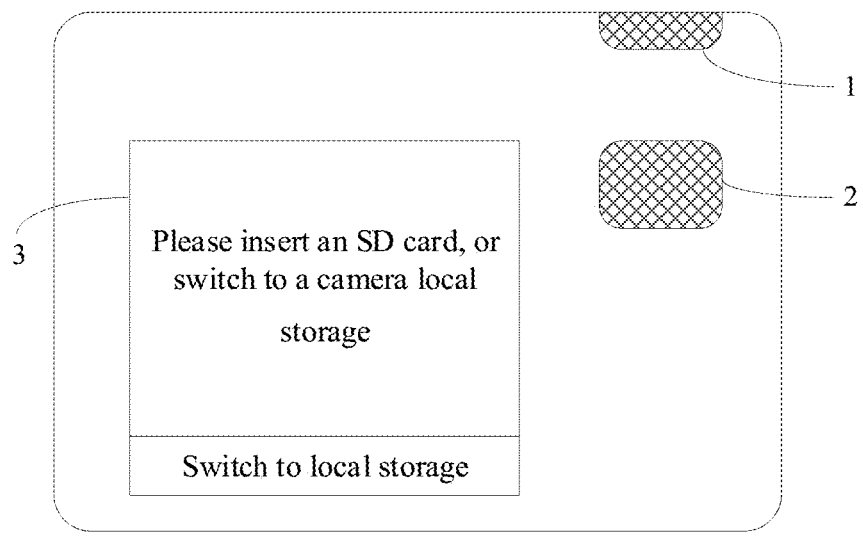

In the case that the storage is set as SD card storage but no SD card exists, when the photographing apparatus it turned on, a text prompt interface corresponding to the problem is displayed in the interface display area 3. As shown in FIG. 13, the text prompt interface displays "Please insert an SD card, or switch to a camera local storage." Further, a switch button for switching to local storage is configured at the bottom of the text prompt interface so that the user can set the storage as local storage after clicking. The shutter and the return button are disabled and the power button of the photographing apparatus can be used in this case. The photographing apparatus can be used normally after the SD card is inserted or after it is switched to local storage.

Figure 14:
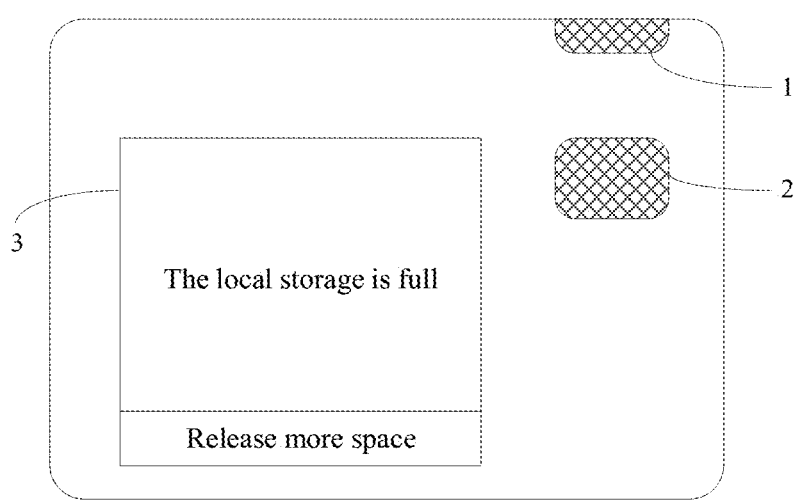

In the case that the storage is set as local storage but the local storage is full, the display interface displays a text prompt interface corresponding to the problem. As shown in FIG. 14, the text prompt interface displays "The local storage is full." Further, a switch button to release space is configured at the bottom of the text prompt interface, so that the interface can jump to the playback interface to facilitate a deletion operation of the stored content by the user. The shutter and the return button are disabled and the power button of the photographing apparatus can be used in this case.

Figure 15:
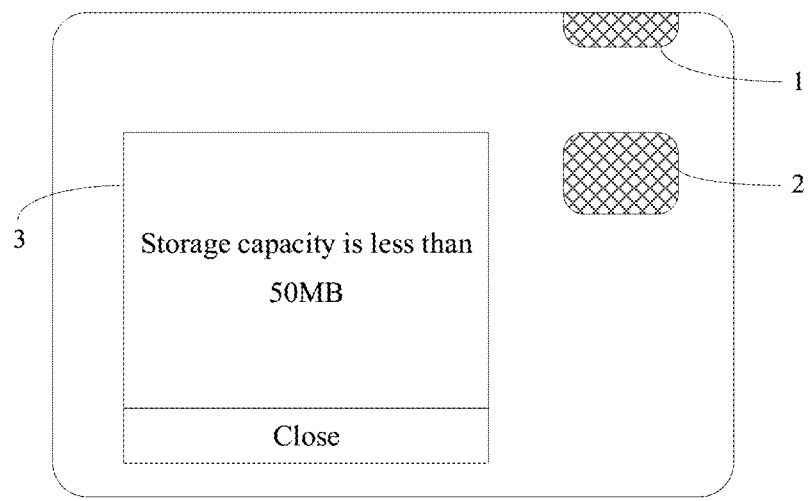

In the case that the storage capacity is insufficient, the display interface displays a text prompt interface corresponding to the problem. As shown in FIG. 15, the text prompt interface displays "Storage capacity is less than 50 MB." Further, a close button is configured at the bottom of the text prompt interface and can be clicked by the user to exit the text prompt interface, and hence the photographing apparatus can be used normally. When the text prompt interface is displayed, the functions of the shutter and the return button can be set as turning off the display screen.

Table 1 illustrates the corresponding relationship between the storage device-related events and the control methods of the photographing apparatus of the present disclosure.

TABLE 1

| Prerequisite | Event | Control method |
| --- | --- | --- |
| photographing mode | Normal storage | Slide up to display capacity parameters |
| None | A video is under repair | Full screen prompt: Please wait |
| User chooses SD card storage | A low-speed SD card is provided | Prompt after booting: Please use an SD card of Class 10 or above (can be closed) |
| | The SD card is full | Full screen prompt: Full SD card, please replace |
| | The SD card writes slowly | Prompt after booting: Slow writing speed of the SD card, suggest to replace (can be closed) |
| | The SD card cannot be recognized | Full screen prompt: Unable to recognize the SD card, please replace |
| | The SD card cluster is abnormal | Prompt after booting: Suggest to format or replace the SD card (can be closed) |
| | The SD card number overflows | Full screen prompt: Suggest to format or replace the SD card |
| | No SD card | Prompt after booting: Please insert an SD card, or switch to a camera local storage |
| User chooses local storage | The local storage is full | Full screen prompt: The local storage is full |
| The storage capacity is insufficient | The storage capacity is insufficient | Full screen prompt: Storage capacity is less than 50 MB (can be closed) |

In some embodiments, when the user slides from upper to lower on the display screen, that is, when the first operation mode is performed, the interface displayed in the interface display area 3 is switched to the photographing mode setting interface.

Figure 16:
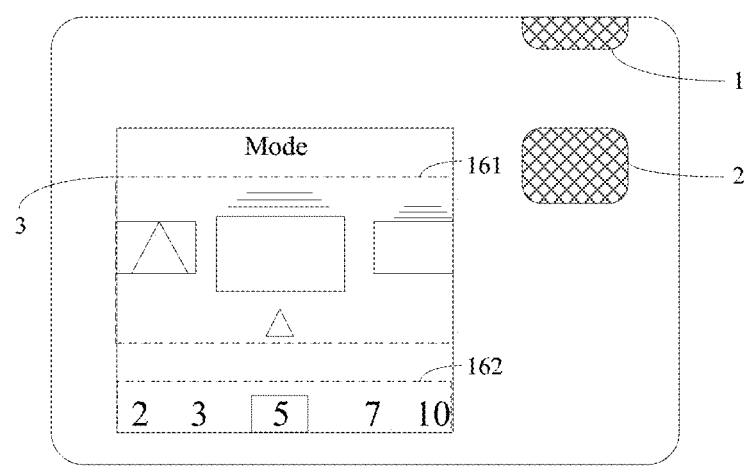
FIG. 16 is a schematic diagram showing a photographing mode setting interface according to one embodiment of the present disclosure.

As shown in FIG. 16, the photographing mode setting interface includes a mode switching area 161 and a mode sub-item switching area 162. A name of the mode currently switched to is further provided above the mode switching area 161. Specifically, the mode switching can be realized by sliding the mode switch area 161 left and right. The mode sub-item switching can be realized by sliding the mode sub-item switching area 162 left and right.

In some embodiments, for the photographing mode setting interface, the functions of the first control button 1 and the second control button 2 can be both set as returning to the real-time framing interface and making the mode currently switched to effective. After the mode takes effect and returns to the real-time framing interface, the name of the mode currently switched to is provided under the real-time framing interface. The mode name disappears after e.g., 1 s, the user clicks anywhere on the screen, or the user presses the shutter halfway or fully.

Figure 17:
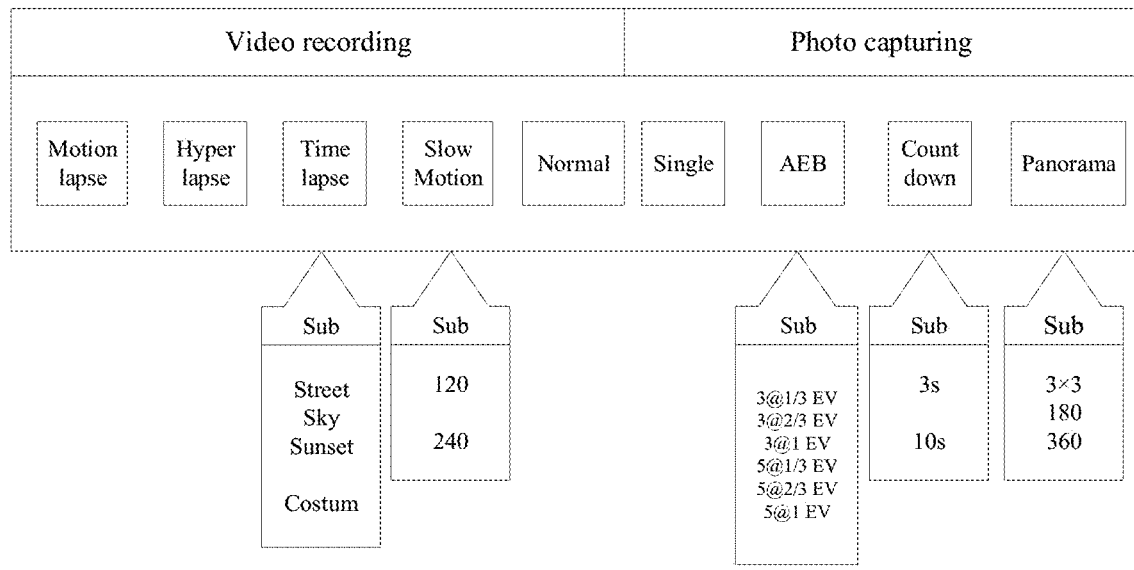
FIG. 17 is a schematic diagram showing a photographing mode and sub-items in the mode according to one embodiment of the present disclosure.

FIG. 17 is a schematic diagram showing a photographing mode and sub-items in the mode. As shown in FIG. 17, the photographing can be video recording or photo capturing. The photographing mode of the video recording can be Motionlapse mode, Hyperlapse mode, Timelapse mode, SlowMotion mode, or normal video recording mode. Sub-items may be further provided for some video recording mode, e.g., the mode sub-items of the Hyperlapse mode may include street, sky, sunset, and custom. The photographing mode of the photo capturing can be single capturing mode, auto exposure bracketing (AEB) mode, countdown capturing mode, or panorama mode. Sub-items may be further provided for some photo capturing mode, e.g., the countdown capturing mode may include sub-items such as 1 s, 10 s, etc.

In some embodiments, the user can click an icon corresponding to the mode or mode sub-item to switch to the real-time framing interface and make the mode switch effective.

It is noted that the developer can set the mode to the normal video recording as the factory setting of the photographing apparatus. When the interface enters the photographing mode setting interface for the second time, the user can see that the currently displayed icon is the mode selected when the user exited last time.

The photographing apparatus control method with respect to the Motionlapse mode further includes one or more steps of monitoring the status of the gimbal, setting a framing position, setting Motionlapse parameters, and determining photographing.

Figure 18:
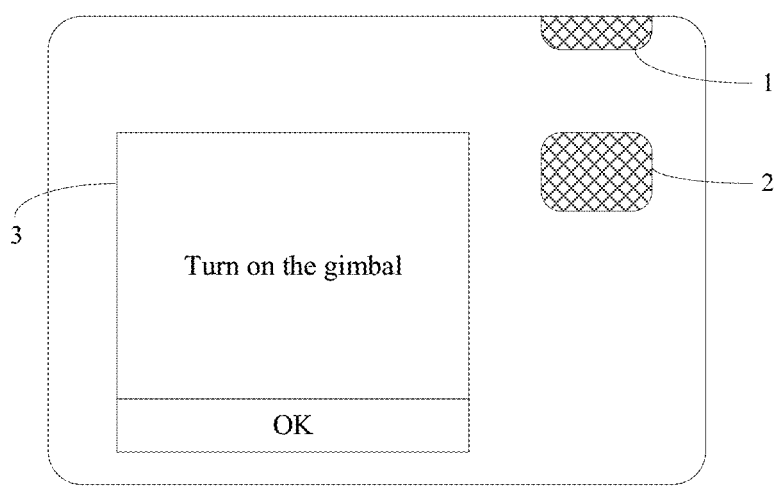
FIG. 18 is a schematic diagram showing a gimbal detection interface according to one embodiment of the present disclosure.

After the photographing mode is switched to the Motionlapse mode, the status of the gimbal can be monitored. Specifically, the system responds to the click operation of the user on the Motionlapse selection control on the photographing mode setting interface to determine whether the gimbal is turned on. When it is determined that the gimbal is not turned on, the display interface is switched to the interface as shown in FIG. 18 to remind the user to turn on the gimbal. On the interface that responds to the click operation of the user, the functions of the first control button 1 and the second control button 2 are both returning to the real-time framing interface, and responding to the pressing operation of the user on the shutter to perform the photographing according to a default track and configuration.

Figure 19:
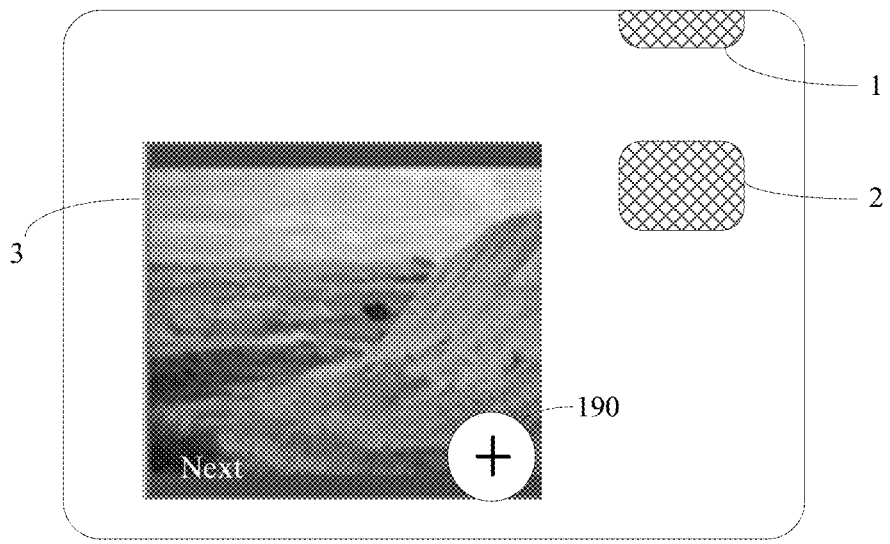
FIG. 19 is a schematic diagram showing a framing position setting interface according to one embodiment of the present disclosure.

When the gimbal is turned on, the interface in the interface display area 3 can be switched to the position setting interface of the real-time framing interface, so that the user can set the framing position. FIG. 19 is a schematic diagram showing a framing position setting interface including a control 190 for user to set the position. Specifically, the control 190 can be provided as a virtual joystick to facilitate the user to set the photographing position. On the position setting interface shown in FIG. 19, the function of the first control button 1 is switching to the framing ineffective interface for the user to choose whether to photograph according to the default track and configuration, and the function of the second control button 2 is returning to the photographing mode setting interface.

The position setting interface may further include a NEXT control. When the user clicks the NEXT control, the display interface can be switched to the Motionlapse parameter setting interface.

Figure 20:
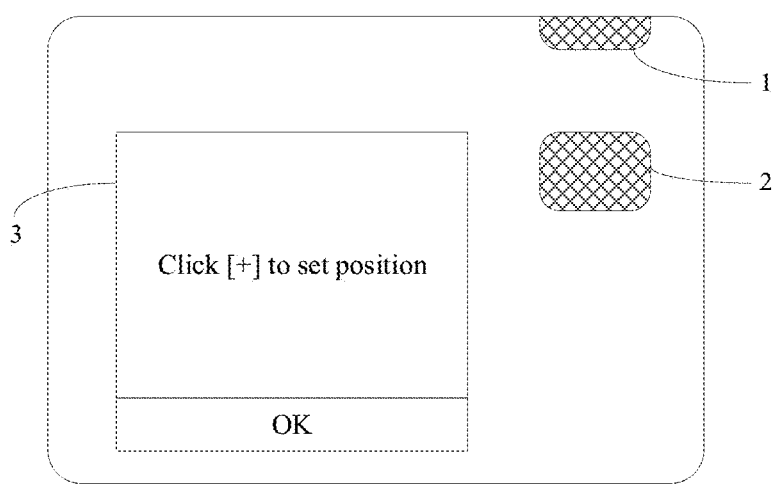
FIG. 20 is a schematic diagram showing a framing position setting prompt interface according to one embodiment of the present disclosure.

In some embodiments, when the user clicks on the area other than the control 190 and the NEXT control on the position setting interface, the display interface can be switched to the framing position setting prompt interface. As shown in FIG. 20, the text prompt content included in the framing position setting prompt interface is "Click [+] to set the position," and hence prompt the user to set the framing position.

In some embodiments, the specific method of setting the framing position may be, the user clicks on any position on the framing interface, drags the control 190 to perform a certain amount of displacement, and stops to get the framing position.

The control 190 can be disabled when the number of set framing positions is equal to a first preset number or the angle between the set framing positions is less than a preset angle. For example, the first preset number can be set as 4 and the preset angle can be set as 1 degree. Then control 190 can be disabled when the number of the framing positions is equal to 4 or the angle between the framing positions is less than 1 degree. On the interface corresponding to disabling the control 190, the function of the first control button 1 can be set as returning to the real-time framing interface, and responding to the pressing operation of the user on the shutter to perform the photographing according to the default track and configuration, and the function of the second control button can be set as returning to the position setting interface and clearing all set positions.

Figure 21:
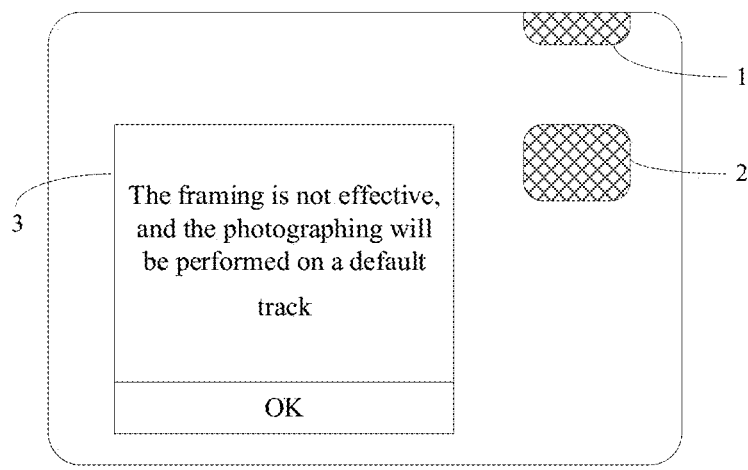
FIG. 21 is a schematic diagram showing a framing ineffective interface according to one embodiment of the present disclosure.

Further, if the number of set framing positions is less than a second preset number, the display interface in the interface display area 3 can be switched to a default photographing mode confirmation interface. For example, the second preset number may be set as 2. FIG. 21 schematically illustrates a default photographing mode confirmation interface with a text prompt showing "The framing is not effective, and the photographing will be performed on a default track." When the user clicks the OK control at the bottom of the text prompt, the photographing will be performed according to the default track and configuration. On the default photographing mode confirmation interface, the function of the first control button 1 can be set as going to the default photographing interface, and the function of the second control button 2 can be set as returning to the position setting interface.

Figure 22:
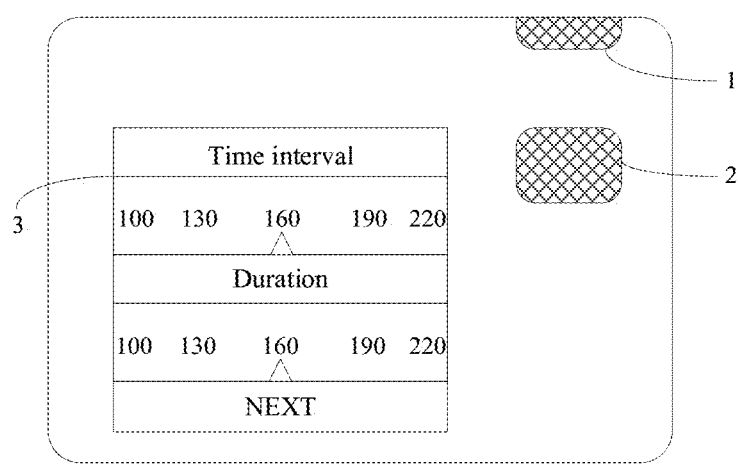
FIG. 22 is a schematic diagram showing a parameter setting interface according to one embodiment of the present disclosure.

After the framing position is set, that is, if the set framing position is greater than 0, the interface switching operation of the user (that is, the user clicks the NEXT control) can be responded to, to switch the display interface to the Motionlapse parameter setting interface so that the user can set the Motionlapse parameters. FIG. 22 schematically illustrates a Motionlapse parameter setting interface that can set a time interval and a duration. The system may further set a non-selectable parameter value to gray according to the storage status of the photographing apparatus. The function of the first control button 1 can be set as returning to the real-time framing interface, and responding to the pressing operation of the user on the shutter to perform the photographing according to the default track and configuration, and the function of the second control button 2 can be set as returning to the position setting interface.

Figure 23:
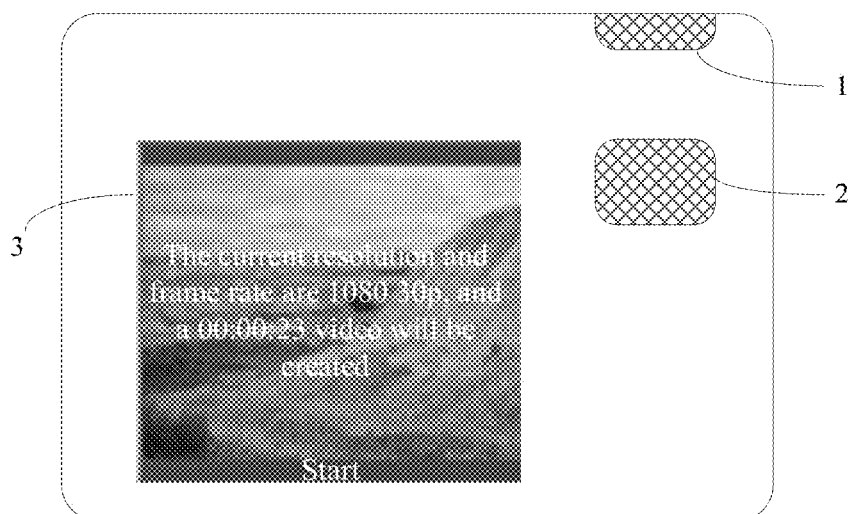
FIG. 23 is a schematic diagram showing a photographing confirmation interface according to one embodiment of the present disclosure.

After the system receives the Motionlapse parameter set by the user and responds to the operation of the user on the NEXT control in the Motionlapse parameter setting interface, the display interface can be switched to the photographing confirmation interface so that the user can confirm to start photographing. FIG. 23 is a schematic diagram showing the photographing confirmation interface with a text prompt showing "The current resolution and frame rate are 1080 30p, and a 00:00:23 video will be created" for the user to confirm. When the user clicks the start control at the bottom of the interface, the photographing according to the setting of the user is performed. On the photographing confirmation interface, the function of the first control button 1 can be set as starting photographing, and the function of the second control button 2 can be set as returning to the Motionlapse parameter setting interface.

Further, when the photographing is started, on the photographing interface, the function of the first control button 1 can be set as stopping photographing, and the second control button 2 can be set as disabling. On the other hand, when the photographing is stopped, the function of the first control button 1 can be set as using the default track and configuration for photographing, and the function of the second control button 2 can be set as a camera trigger.

The photographing apparatus control method with respect to the Hyperlapse mode further includes one or more steps of monitoring the status of the gimbal, setting Hyperlapse parameters, and determining photographing.

After the photographing mode is switched to the Hyperlapse mode, the status of the gimbal can be monitored. Specifically, the system responds to the click operation of the user on the Hyperlapse selection control on the photographing mode setting interface to determine whether the gimbal is turned on. When it is determined that the gimbal is not turned on, the display interface is switched to the interface as shown in FIG. 18 to remind the user to turn on the gimbal. On the interface that responds to the click operation of the user, the functions of the first control button 1 and the second control button 2 are both returning to the real-time framing interface, and responding to the pressing operation of the user on the shutter to perform the photographing according to a default track and configuration.

When the gimbal is turned on, the interface switching operation of the user (that is, the user clicks the OK control) can be responded to switch the display interface to the Hyperlapse parameter setting interface so that the user can set the Hyperlapse parameters. FIG. 22 schematically illustrates a Hyperlapse parameter setting interface that can set a time interval and a duration. The system may further set a non-selectable parameter value to gray according to the storage status of the photographing apparatus. The function of the first control button 1 can be set as returning to the real-time framing interface, and responding to the pressing operation of the user on the shutter to perform the photographing according to the default track and configuration, and the function of the second control button can be set as returning to the photographing mode setting interface.

After the system receives the Hyperlapse parameter set by the user and responds to the operation of the user on the NEXT control in the Hyperlapse parameter setting interface, the display interface can be switched to the photographing confirmation interface so that the user can confirm to start photographing. FIG. 23 is a schematic diagram showing the photographing confirmation interface with a text prompt showing "The current resolution and frame rate are 1080 30p, and a 00:00:23 video will be created" for the user to confirm. When the user clicks the start control at the bottom of the interface, the photographing according to the setting of the user is performed. On the photographing confirmation interface, the function of the first control button 1 can be set as starting photographing, and the function of the second control button 2 can be set as returning to the Hyperlapse parameter setting interface.

Further, when the photographing is started, on the photographing interface, the function of the first control button 1 can be set as stopping photographing, and the function of the second control button 2 can be set as a camera trigger.

The control operation of the Timelapse mode will be described as follows. As shown in FIG. 17, the mode sub-items of the Timelapse mode includes a preset mode (i.e., street, sky, sunset, etc.) and a custom mode.

In some embodiments, the user can select a preset mode on the mode sub-item switching interface of the Timelapse mode. On the mode sub-item switching interface, the functions of the first control button 1 and the second control button 2 are both returning to the real-time framing interface, and responding to the pressing operation of the user on the shutter to perform the photographing according to a default track and configuration.

Figure 24:
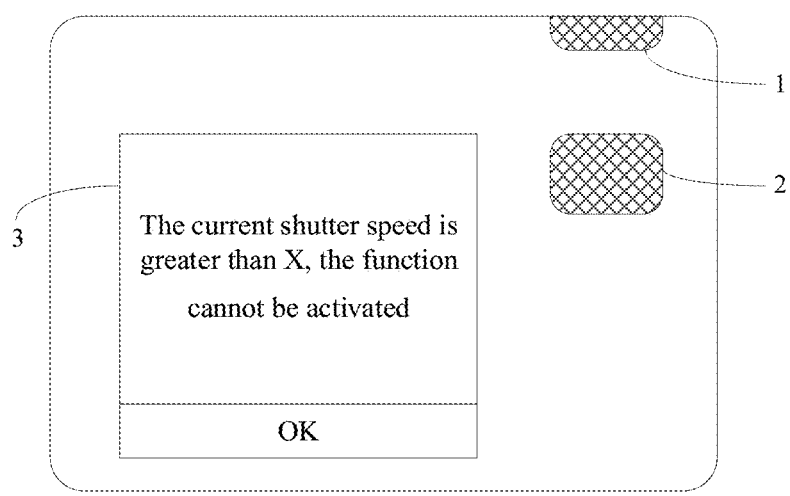
FIG. 24 is a schematic diagram showing a shutter speed prompt interface according to one embodiment of the present disclosure.

When the user selects a preset mode for photographing, it can be determined whether the current shutter speed is greater than a preset shutter speed X, and when the current shutter speed is greater than the preset shutter speed X, the display interface can be switched to the shutter speed prompt interface. As shown in FIG. 24, the text prompt content included in the shutter speed prompt interface is "The current shutter speed is greater than X, the function cannot be activated." The preset shutter speed X can be set by the developer according to an actual need. For example, in the street mode, when the time interval is 2 s and the duration is infinite, the preset shutter speed X can be set as 2 s. In the sky mode, when the time interval is 5 s and the duration is infinite, the preset shutter speed X can be set as 5 s. In the sunset mode, when the time interval is 10 s and the duration is infinite, the preset shutter speed X can be set as 10 s. It is noted that the term "infinite" as used herein can refer to a maximum duration for photographing when the storage space allows.

When the user sets the shutter speed to be not greater than the preset shutter speed X, the user can click the OK control on the shutter speed prompt interface to switch the interface to the Timelapse preset photographing interface. Or when it is determined that the shutter speed is not greater than the preset shutter speed X on the Timelapse preset photographing interface, the user can click the OK control on the shutter speed prompt interface to switch the interface to the Timelapse preset photographing interface. On the Timelapse preset photographing interface, the function of the first control button 1 can be set as starting photographing, and the function of the second control button 2 can be set as a camera trigger. When the photographing is started, the function of the first control button 1 can be set as stopping photographing, and the function of the second control button 2 can be set as a camera trigger.

In some embodiments, the user can select a custom mode on the mode sub-item switching interface of the Timelapse mode. In the custom mode, the control method may include setting custom parameters and/or confirming photographing.

Specifically, after the user selects the custom mode, the display interface can be switched to the custom parameter setting interface so that the user can set the custom parameter. The custom parameter setting interface may be the same as the parameter setting interface shown in FIG. 22. On the custom parameter setting interface, the function of the first control button 1 can be set as returning to the real-time framing interface, and responding to the pressing operation of the user on the shutter to perform the photographing according to the default track and configuration, and the function of the second control button 2 can be set as returning to the photographing mode setting interface.

After the system receives the custom setting parameter, the display interface can be switched to the photographing confirmation interface to respond to the confirmation operation of the user and start photographing. The photographing confirmation interface may be the same as the photographing confirmation interface shown in FIG. 23. On the photographing confirmation interface, the function of the first control button 1 can be set as starting photographing, and the function of the second control button 2 can be set as returning to the custom parameter setting interface. When the photographing is started, the function of the first control button 1 can be set as stopping photographing, and the function of the second control button 2 can be set as a camera trigger.

In one embodiment of the present disclosure, in order to save power, in a photographing mode other than the Hyperlapse mode, after the photographing is started, if the user does not perform any operation after a fourth predetermined time, a dark screen is scheduled for a fifth time. For example, the fourth predetermined time may be set as 60 s, and the fifth predetermined time may be set as 10 s. Further, after the dark screen lasts for the fifth predetermined time, the screen is turned off.

In some embodiments, when the user slides on the display screen from right to left, that is, when the fourth operation mode is performed, the interface displayed in the interface display area 3 is switched to the photographing apparatus parameter setting interface.

In one embodiment of the present disclosure, the photographing apparatus parameter may include, e.g., one or more of switching between manual or automatic mode, exposure compensation, shutter speed, photosensitivity, photo aspect ratio, video resolution and frame rate, white balance, high dynamic range (HDR), photo format, video format, peak focus, and enhancement mode.

Figure 25:
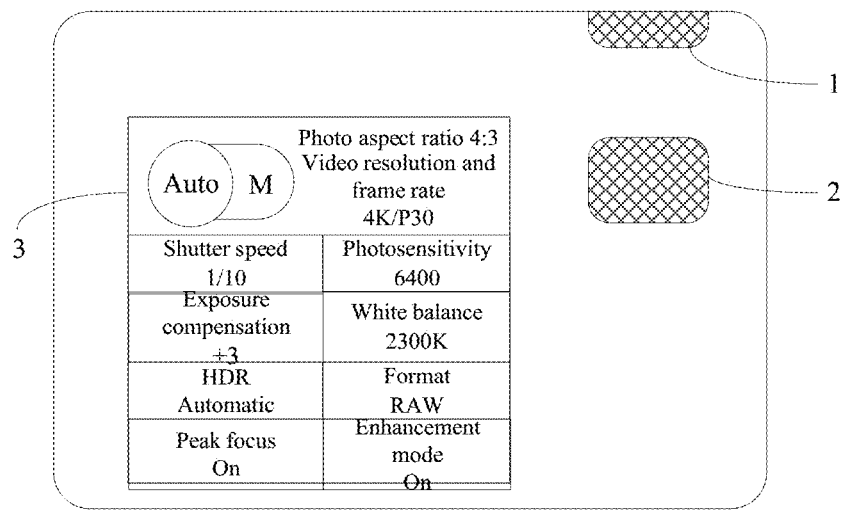
FIG. 25 is a schematic diagram showing a photographing apparatus parameter setting interface according to one embodiment of the present disclosure.

FIG. 25 is a schematic diagram showing a photographing apparatus parameter setting interface. During the display, the present disclosure may also include the arrangement and layout of other photographing apparatus parameters, which are not particularly limited in this embodiment. On the parameter setting interface of the photographing apparatus, the function of the first control button 1 can be set as returning to the real-time framing interface by pressing half or full, and the function of the second control button 2 can be set as returning to the real-time framing interface.

Figure 26:
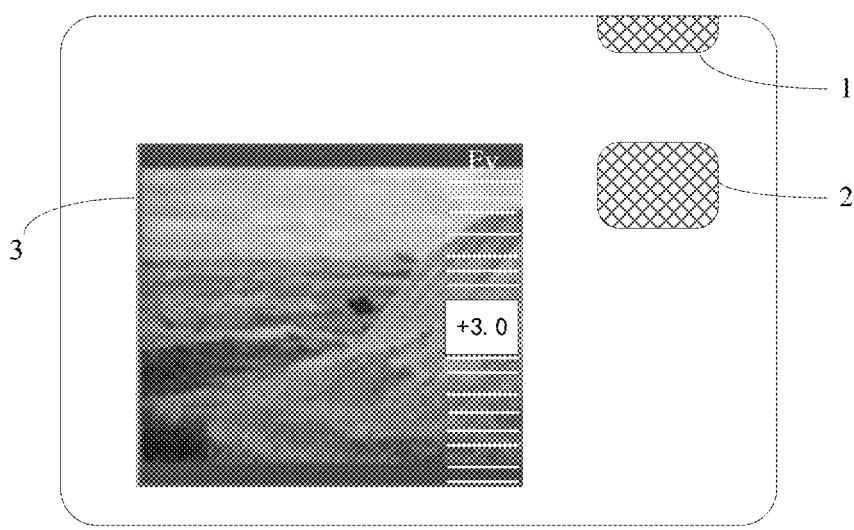
FIG. 26 is a schematic diagram showing an interface for setting exposure compensation in the form of a scroll wheel according to one embodiment of the present disclosure.

FIG. 26 is a schematic diagram showing an interface for setting exposure compensation in the form of a scroll wheel, on which the function of the first control button 1 can be set as returning to the real-time framing interface by pressing half or full, and the function of the second control button 2 can be set as returning to the previous interface.

Figure 27:
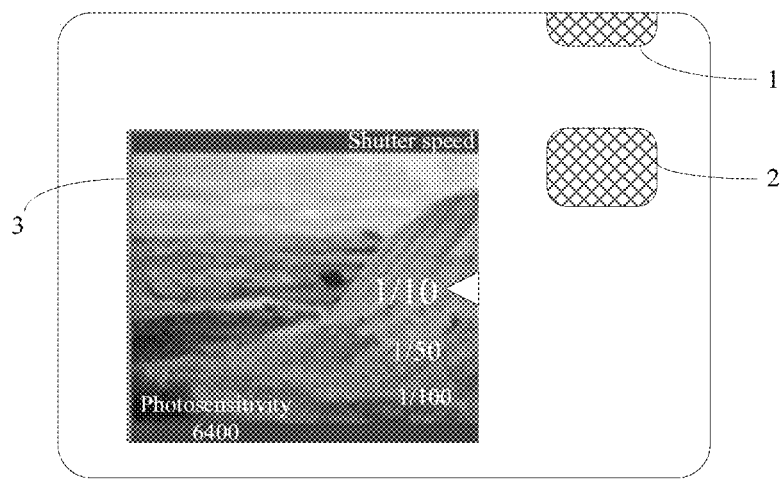
FIG. 27 is a schematic diagram showing an interface for setting a shutter speed and a photosensitivity in the form of a scroll wheel according to one embodiment of the present disclosure.

FIG. 27 is a schematic diagram showing an interface for setting a shutter speed and a photosensitivity in the form of a scroll wheel, on which the switching of the shutter speed or the photosensitivity setting can be realized by clicking the area where the text "Shutter Speed" or "Photosensitivity" is displayed. The function of the first control button 1 can be set as returning to the real-time framing interface by pressing half or full, and the function of the second control button 2 can be set as returning to the previous interface.

Figure 28:
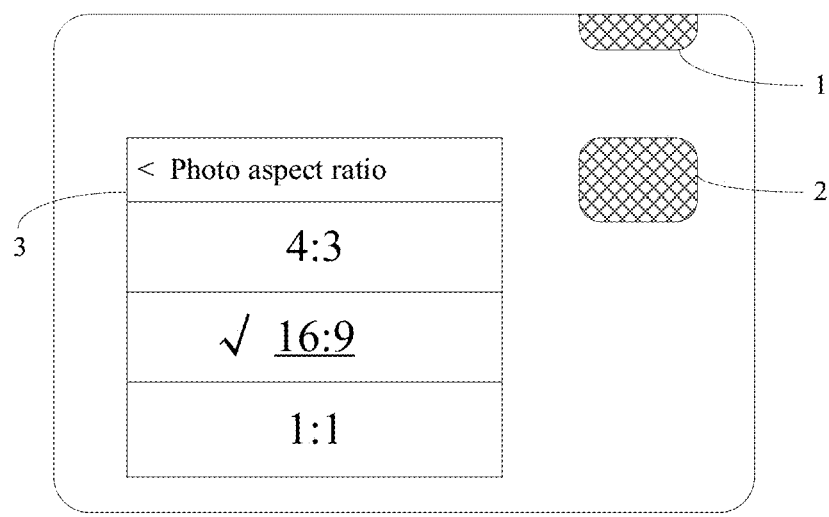
FIG. 28 is a schematic diagram showing an interface for setting a photo aspect ratio according to one embodiment of the present disclosure.

FIG. 28 is a schematic diagram showing an interface for setting a photo aspect ratio. When the user selects an aspect ratio, the selected aspect ratio can change the style. For example, as shown in FIG. 28, an underline is added and a check mark icon is added in front. The user can also customize photo aspect ratio. The function of the first control button 1 can be set as returning to the real-time framing interface by pressing half or full, and the function of the second control button 2 can be set as returning to the previous interface.

Figure 29:
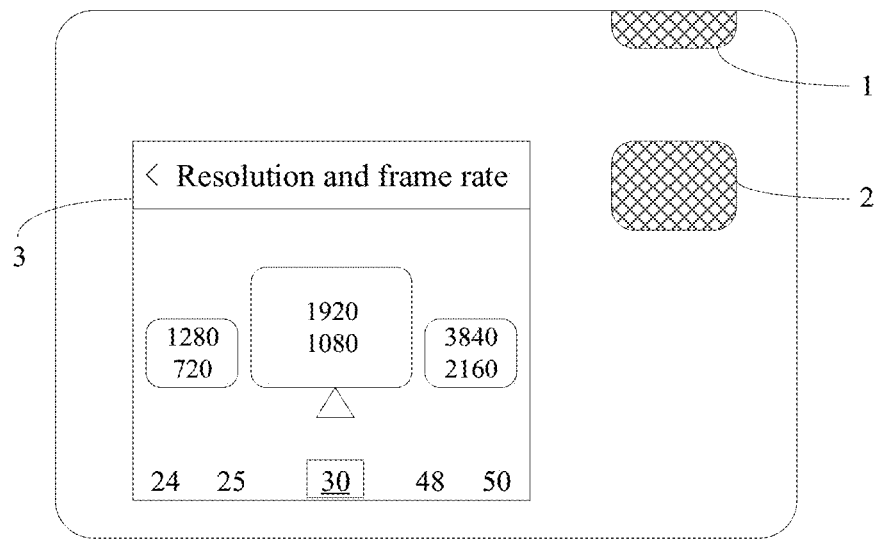
FIG. 29 is a schematic diagram showing an interface for setting video resolution and frame rate in the form of a scroll wheel according to one embodiment of the present disclosure.

FIG. 29 is a schematic diagram showing an interface for setting video resolution and frame rate in the form of a scroll wheel, where the function of the first control button 1 can be set as returning to the real-time framing interface by pressing half or full, and the function of the second control button 2 can be set as returning to the previous interface.

Figure 30:
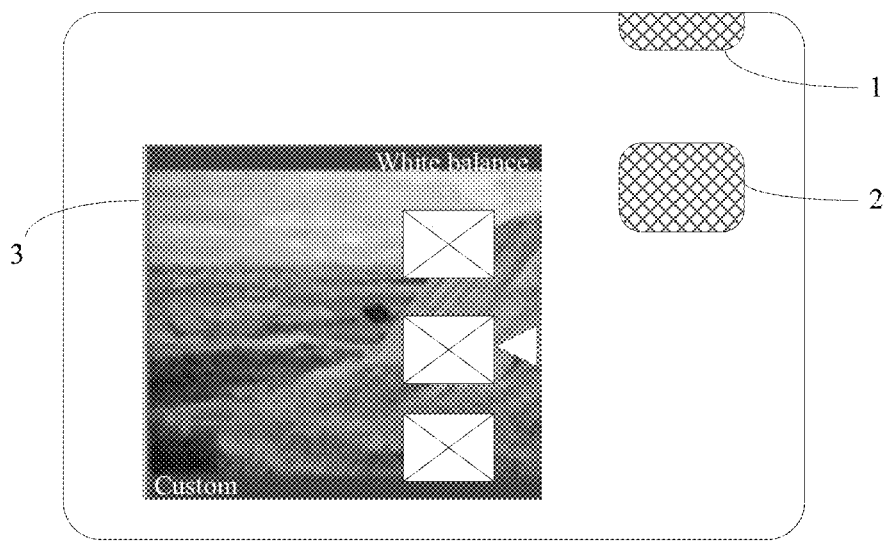
FIG. 30 is a schematic diagram showing an interface for setting white balance in the form of a scroll wheel according to one embodiment of the present disclosure.
Figure 31:
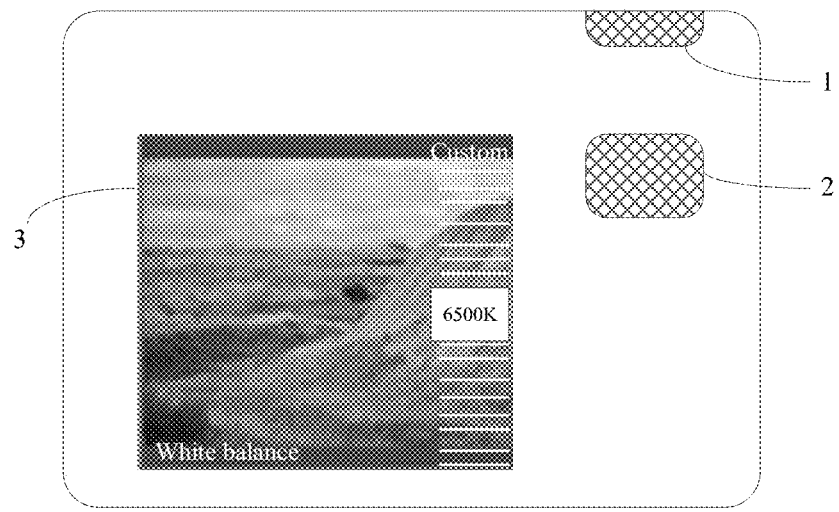
FIG. 31 is a schematic diagram showing custom setting the white balance in the form of a scroll wheel according to one embodiment of the present disclosure.

FIG. 30 is a schematic diagram showing an interface for setting white balance in the form of a scroll wheel. When the user clicks the custom button at the bottom left, the display interface can switch to the custom white balance parameter setting interface as shown in FIG. 31. On the interface shown in FIG. 30 or FIG. 31, the function of the first control button 1 can be set as returning to the real-time framing interface by pressing half or full, and the function of the second control button 2 can be set as returning to the previous interface.

Figure 32:
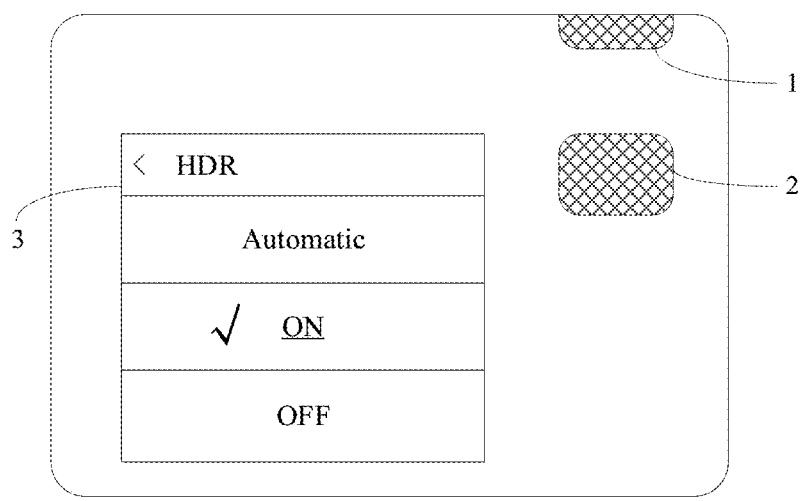
FIG. 32 is a schematic diagram showing an interface for setting HDR according to one embodiment of the present disclosure.

FIG. 32 is a schematic diagram showing an interface for setting HDR, where the function of the first control button 1 can be set as returning to the real-time framing interface by pressing half or full, and the function of the second control button 2 can be set as returning to the previous interface.

Figure 33:
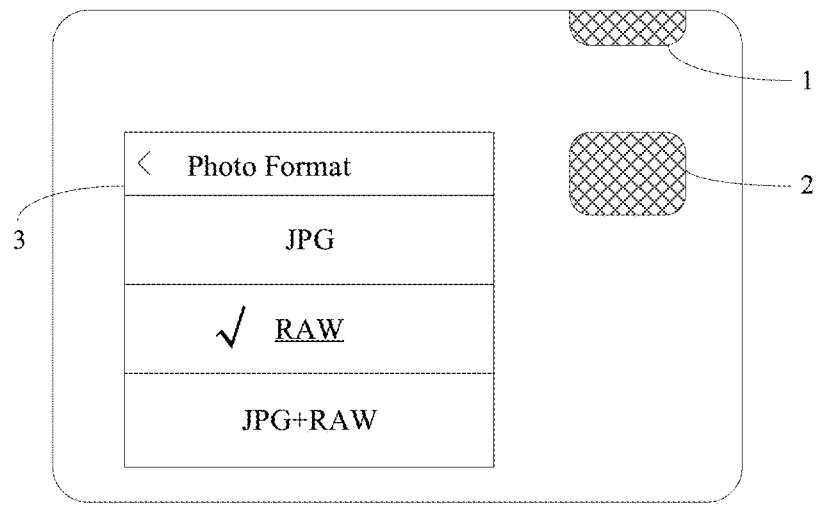
FIG. 33 is a schematic diagram showing an interface for setting a photo format according to one embodiment of the present disclosure.

FIG. 33 is a schematic diagram showing an interface for setting a photo format. The photo format is not limited to the format shown in FIG. 33, but can also include other formats, e.g., GIF, PNG, BMP, etc. The function of the first control button 1 can be set as returning to the real-time framing interface by pressing half or full, and the function of the second control button 2 can be set as returning to the previous interface.

Figure 34:
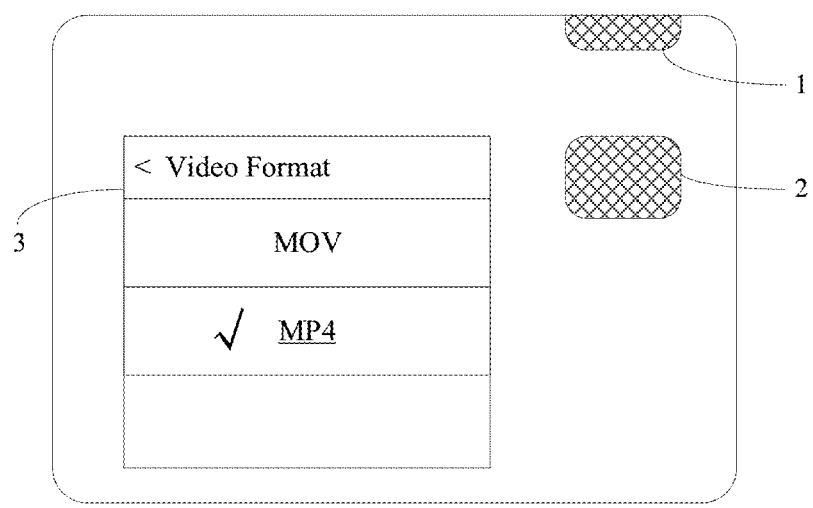
FIG. 34 is a schematic diagram showing an interface for setting a video format according to one embodiment of the present disclosure.

FIG. 34 is a schematic diagram showing an interface for setting a video format. Other selectable video formats can also include AVI, WMW, RMVB, etc. The function of the first control button 1 can be set as returning to the real-time framing interface by pressing half or full, and the function of the second control button 2 can be set as returning to the previous interface.

Figure 35:
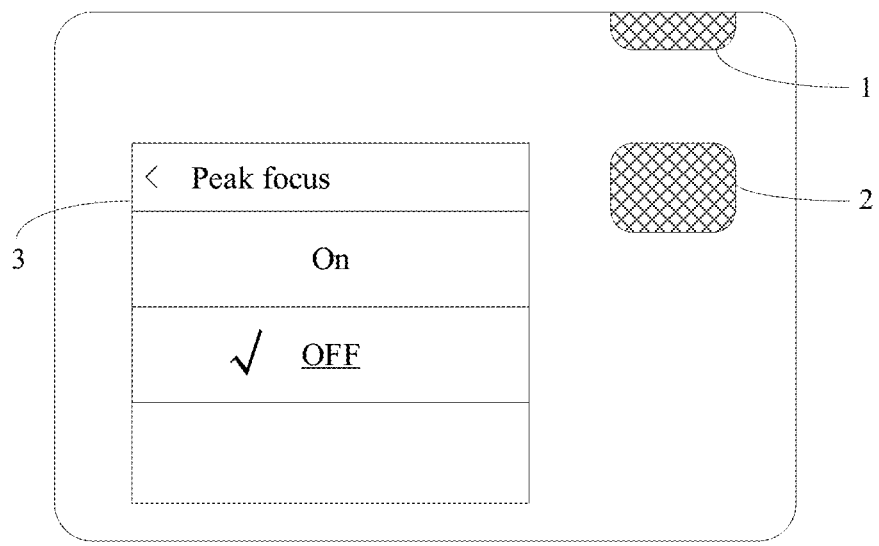
FIG. 35 is a schematic diagram showing an interface for setting peak focus according to one embodiment of the present disclosure.

FIG. 35 is a schematic diagram showing an interface for setting peak focus, where the function of the first control button 1 can be set as returning to the real-time framing interface by pressing half or full, and the function of the second control button 2 can be set as returning to the previous interface.

Figure 36:
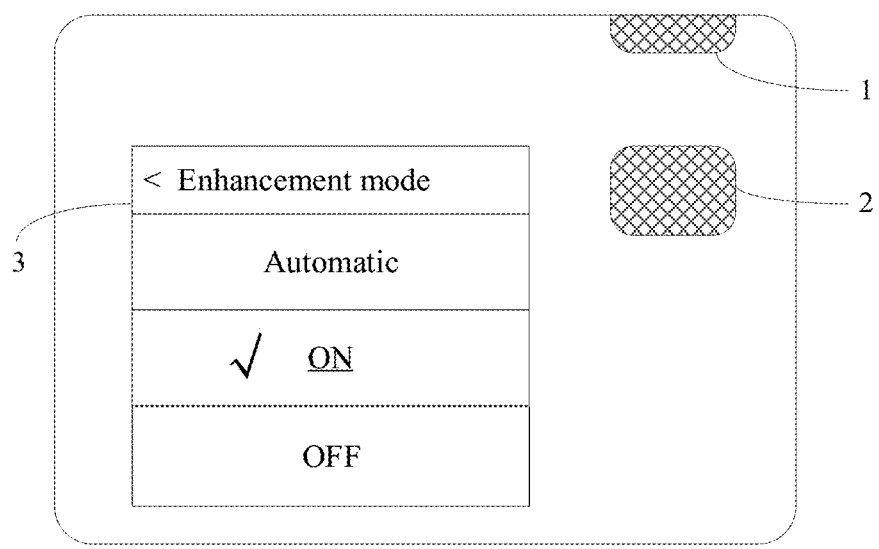
FIG. 36 is a schematic diagram showing an interface for setting an enhancement mode according to one embodiment of the present disclosure.

FIG. 36 is a schematic diagram showing an interface for setting an enhancement mode, where the function of the first control button 1 can be set as returning to the real-time framing interface by pressing half or full, and the function of the second control button 2 can be set as returning to the previous interface.

In some embodiments, when the user slides on the display screen from left to right, that is, when the third operation mode is performed, the interface displayed in the interface display area 3 is switched to the playback control interface.

In the playback control interface, the playback file can be sorted by photographing time for user to perform playback choice. The playback content may include video playback content and photo playback content, where the playback content may refer to the playback file. If no playback file exists, a text prompt can be displayed on the interface, e.g., "Empty album."

Figure 37:
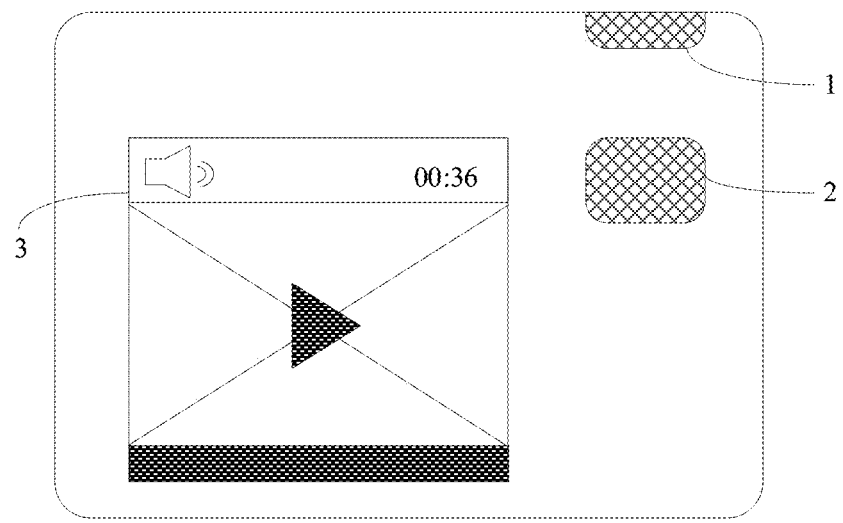
FIG. 37 is a schematic diagram showing an interface for confirming playback of a video according to one embodiment of the present disclosure.

When the user selects the video file to be played back, the display interface can be switched to the interface for confirming the playback of the video. As shown in FIG. 37, a sound button is displayed at the top of the interface for the user to control the volume of the playback video, and the total length of the video file is also displayed. The user can click on the video area of the interface to start playback. On this interface, the functions of the first control button 1 and the second control button 2 can be both set as returning to the real-time framing interface.

Figure 38:
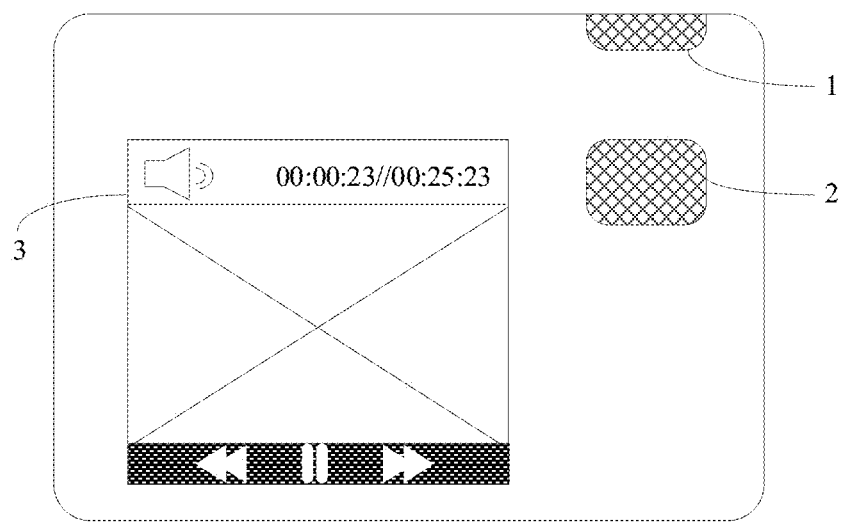
FIG. 38 is a schematic diagram showing an interface of video playback according to one embodiment of the present disclosure.

When the user determines the video file to be played back and clicks on the video area, the video starts to play back. As shown in FIG. 38, the total video duration and the current playback duration are displayed at the top of the playback interface. The user can click the playback control button at the bottom of the interface to control the playback content. For example, the operation for controlling playback content may include, but not limited to, pausing, playing back the next video, playing back the previous video, fast forwarding, rewinding, etc. On this interface, the function of the first control button 1 can be set as returning to the real-time framing interface, and the function of the second control button 2 can be set as returning to the previous interface.

Figure 39:
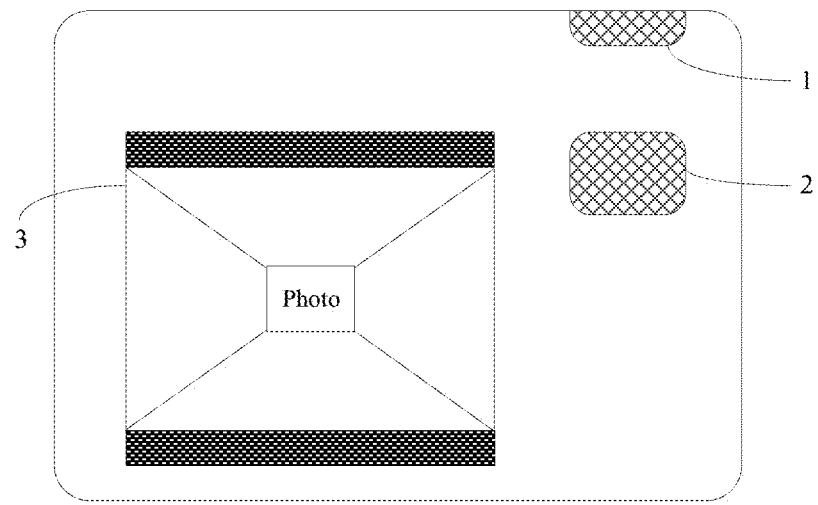
FIG. 39 is a schematic diagram showing an interface of photo playback according to one embodiment of the present disclosure.

In the present disclosure, the photo playback may include normal photo playback, continuous photo playback, and panoramic photo playback. FIG. 39 is a schematic diagram showing an interface for a normal photo playback including a photo area. On this interface, the functions of the first control button 1 and the second control button 2 can be both set as returning to the real-time framing interface.

Figure 40:
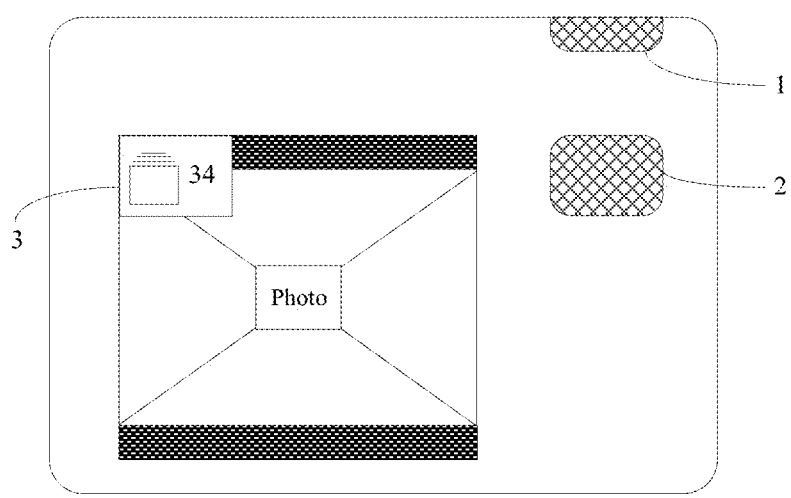
FIG. 40 is a schematic diagram showing an interface of taking burst photos according to one embodiment of the present disclosure.

FIG. 40 is a schematic diagram showing an interface of a consecutive photo file. The number of consecutive photos in the group is displayed in the upper left of the interface. On this interface, the functions of the first control button 1 and the second control button 2 can be both set as returning to the real-time framing interface.

Figure 41:
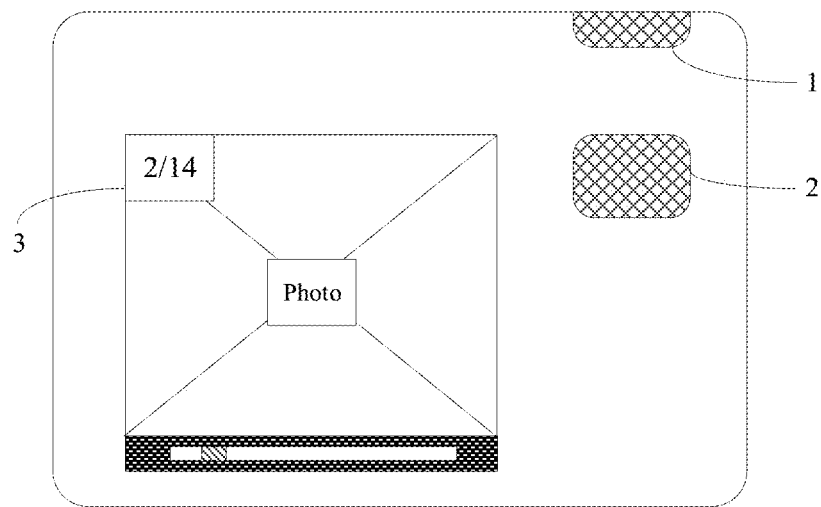
FIG. 41 is a schematic diagram showing an interface of the playback of burst photos according to one embodiment of the present disclosure.

As shown in FIG. 41, after the playback of the consecutive photo is started, the number of photos played back and the total number of photos in the group are displayed in the top left of the interface. A progress bar for the playback of photos is also provided at the bottom of the interface so that the user knows the playback status. On this interface, the function of the first control button 1 can be set as returning to the real-time framing interface, and the function of the second control button 2 can be set as returning to the previous interface.

Figure 42:
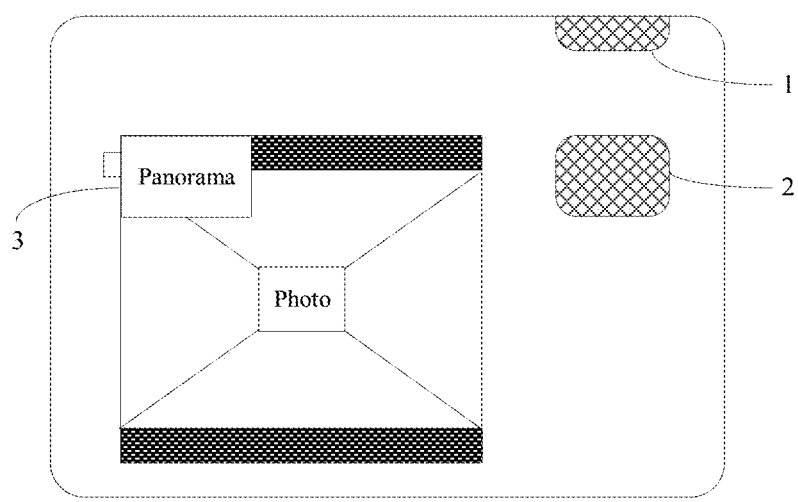
FIG. 42 is a schematic diagram showing an interface of a panoramic photo according to one embodiment of the present disclosure.

FIG. 42 is a schematic diagram showing an interface of a panoramic photo, where the functions of the first control button 1 and the second control button 2 can be both set as returning to the real-time framing interface.

Figure 43:
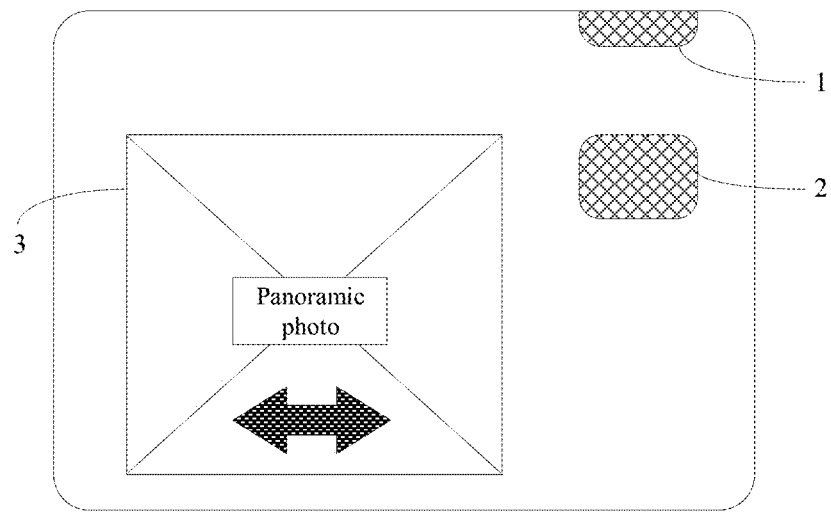
FIG. 43 is a schematic diagram showing an interface of panoramic photo playback according to one embodiment of the present disclosure.

FIG. 43 is a schematic diagram showing an interface of a playback of the panoramic photo. The interface includes a playback control that the user can use to control the photo to move left and right so that the user can view the panoramic photo. On this interface, the function of the first control button 1 can be set as returning to the real-time framing interface, and the function of the second control button 2 can be set as returning to the previous interface.

Figure 44:
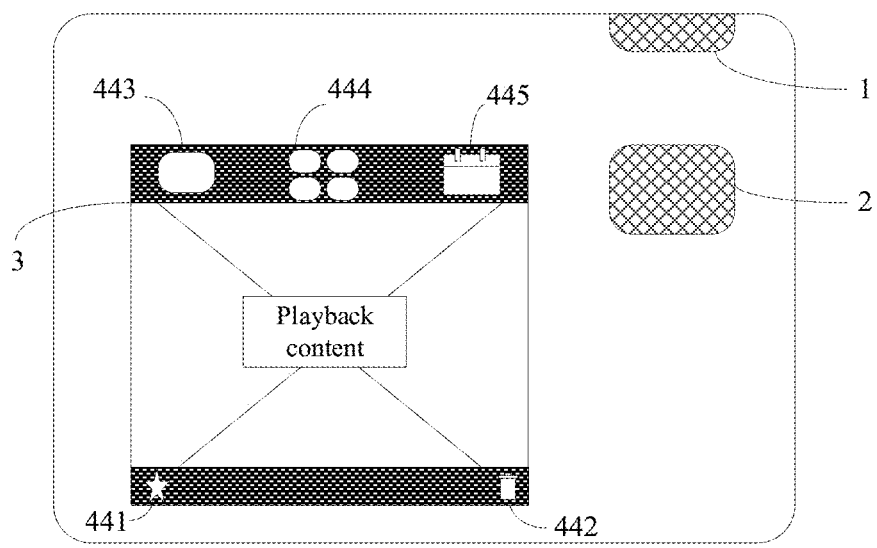
FIG. 44 is a schematic diagram showing an interface for bookmarking or deleting a playback content according to one embodiment of the present disclosure.

On the interface shown in FIG. 37, FIG. 39, FIG. 40, or FIG. 42, when the user clicks on an area other than the video area or the photo area, that is, when the user clicks on an area other than the playback content, the interface in the interface display area 3 can be displayed as a plurality of controls as shown in FIG. 44. The plurality of controls include a bookmark control 441, a delete control 442, a current file control 443, a file list control 444, and a date list control 445. The user can click the bookmark control 441 to bookmark the current playback content. The user can click the delete control 442 to delete the current playback content. The user can click the current file control 443 or the file list control 444 to switch between the current file and the file list. The user can click the data list control 445 to view playback contents by date.

These controls will disappear after they are displayed on the interface for a sixth predetermined time. For example, the sixth predetermined time may be set as 1 s.

In some embodiments, the user can switch the display interface to the file list interface by clicking the file list control 444. The user can select a plurality of playback contents at the same time in the file list display interface. For example, check marks will appear at the top right of the icons of the selected playback contents. The user may then click the bookmark control 441 to perform the bookmark operation to the plurality of playback contents. The user can click the delete control 442 to perform the delete operation to the plurality of playback contents. And hence, the present disclosure can realize a simultaneous selection of the plurality of playback contents for bookmark or deletion.

In some embodiments, the user can switch the display interface to the data list interface by clicking the date list control 445. The user can select a plurality of dates at the same time in the date list display interface. For example, check marks will appear at the right of the selected dates. The user may then click the bookmark control 441 to perform the bookmark operation to the contents photographed in the selected dates. The user can click the delete control 442 to perform the delete operation to the contents photographed in the selected dates. And hence, the present disclosure can realize bookmark or deletion to the playback content according to the photographing date.

A playback content that has been bookmarked can be marked for the user to distinguish, e.g., an icon can be provided and placed at the lower left corner of the playback content. On the other hand, after the user clicks the delete control 442, the interface can display a text prompt to confirm the deletion and the confirmation control, to prevent the loss caused by a wrong operation of the user.

In the process of the video playback, the operations of the user can control volume, playback speed, full-screen playback, and pause playback of the playback video.

In some embodiments, the sliding operation of the user on the playback interface can realize the playback of each photo in the consecutive photos. The interface can further include the playback progress control to control the playback progress. In some embodiments, this playback progress control can be integrated with the progress bar described above. The entire group of the consecutive photos can be deleted, or a single photo can be deleted during the consecutive photo playback. During the bookmark operation of the consecutive photos, the whole group or a single photo can be bookmarked, in which the icons of the bookmark of the whole group and the bookmark of the single photo should be different. In one embodiment where a star pattern is used as the icon, the icon of the bookmark of the whole group can be a whole star, and if one or more photos in the whole group of the consecutive photos are not bookmarked, the icon of the bookmark can be a half star.

In the embodiments of the present disclosure, as shown in, e.g., FIG. 5, a gimbal setting, a general setting, and other function settings can be modified in response to the operation of the user on the photographing function setting interface.

Figure 45:
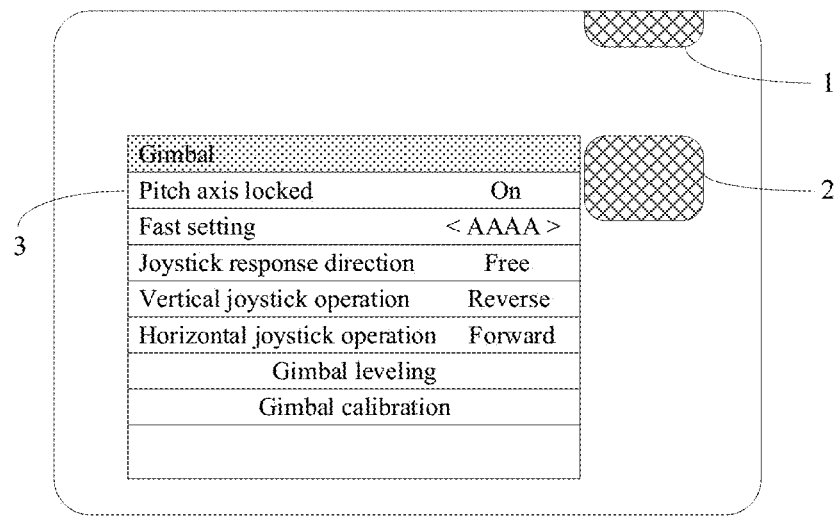
FIG. 45 is a schematic diagram showing a gimbal setting interface according to one embodiment of the present disclosure.

In some embodiments, when the user clicks the gimbal setting control shown in FIG. 5, the display interface in the interface display area 3 is switched to the gimbal setting interface shown in FIG. 45. On the gimbal setting interface, the function of the first control button 1 can be set as returning to the real-time framing interface by pressing half or full, and the function of the second control button 2 can be set as returning to the previous interface.

On the gimbal setting interface, an object that the user can set includes, but not limited to, whether the pitch axis is locked, fast setting level, joystick response direction, vertical joystick operation direction, horizontal joystick operation direction, gimbal leveling, automatic calibration of the gimbal, etc. The user can set each object according to the actual photographing scene.

Figure 46:
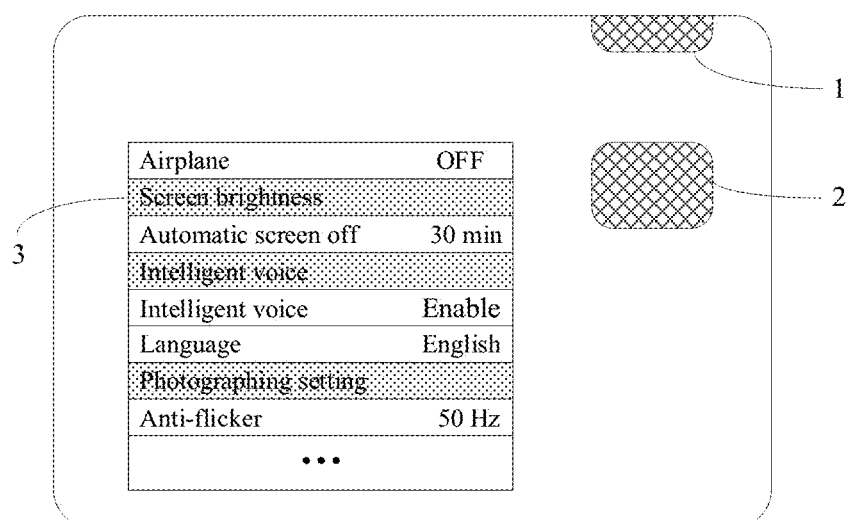
FIG. 46 is a schematic diagram showing a general parameter setting interface according to one embodiment of the present disclosure.

In some embodiments, when the user clicks the general setting control shown in FIG. 5, the display interface in the interface display area 3 is switched to the general setting interface shown in FIG. 46. On the general setting interface, the function of the first control button 1 can be set as returning to the real-time framing interface by pressing half or full, and the function of the second control button 2 can be set as returning to the previous interface.

On the general setting interface, an object that the user can set includes, but not limited to, whether to enable airplane mode, screen brightness, automatic screen off time, whether to enable intelligent voice, voice language type, photographing settings, photographing anti-flicker parameters, video encoding, video system, storage, format SD card, camera language, etc. The user can set each object according to the actual photographing scene.

Figure 47:
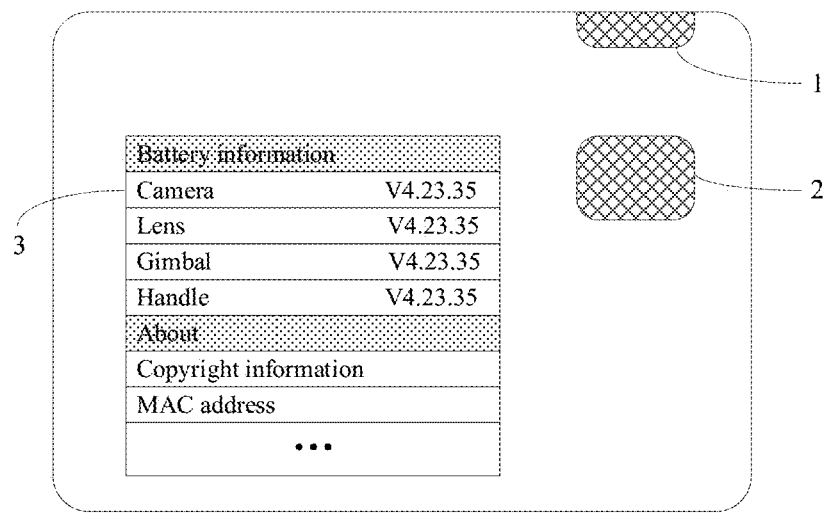
FIG. 47 is a schematic diagram showing a setting interface for other parameters according to one embodiment of the present disclosure.

In some embodiments, when the user clicks the ABOUT control shown in FIG. 5, the display interface in the interface display area 3 is switched to the other function setting interface shown in FIG. 47. On the other function setting interface, the function of the first control button 1 can be set as returning to the real-time framing interface by pressing half or full, and the function of the second control button 2 can be set as returning to the previous interface.

On the other function setting interface, the user can query battery information, activation information, copyright information, and MAC address. Further, a control for restoring factory settings is provided on the interface to restore the photographing apparatus to the factory settings in response to the click operation on it by the user.

Further, during the setting of the photographing function, a secondary confirmation interface can be set. For example, when the user clicks the control for restoring the factory settings, the interface is switched to a text prompt, e.g., "Are you sure to restore the factory settings?" Only when the user clicks the OK control at the bottom of the interface, the operation of restoring the factory settings can take effect, and hence the loss caused by a wrong operation of the user can be avoided.

Figure 48:
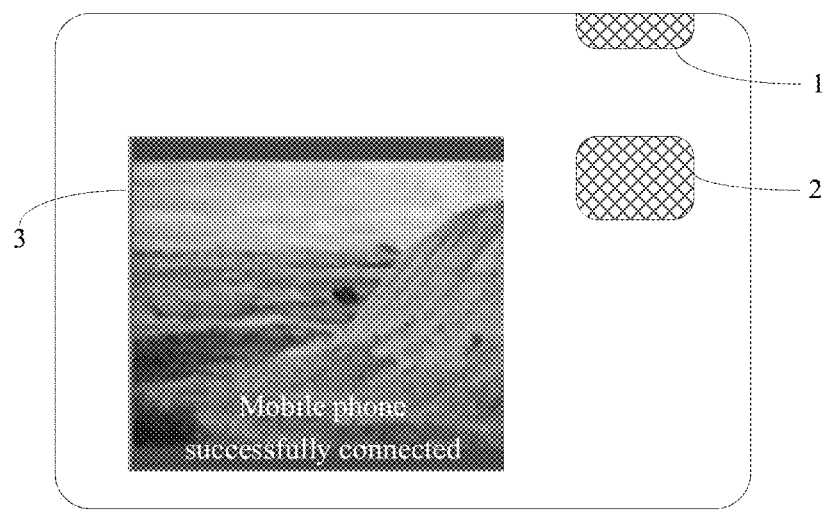
FIG. 48 is a schematic diagram showing a mobile phone connection prompt interface according to one embodiment of the present disclosure.

In one embodiment of the present disclosure, the photographing apparatus control method may further include connecting the photographing apparatus with a mobile phone. The photographing apparatus can also be connected to a mobile device such as a tablet, etc. As shown in FIG. 48, when the connection is successful, the interface displays a text prompt (e.g., "Mobile phone successfully connected") to inform the user, and the text prompt can disappear after 1 s. When the connection is disconnected, the interface can also display a text prompt (e.g., "Mobile phone disconnected").

In some embodiments, the photographing apparatus can include a gimbal. In practice, the gimbal is tilted sometimes, and the photographing apparatus will be tilted with the gimbal. According to the embodiments of the present disclosure, responses to the case that the gimbal is tilted is also provided as shown in Table 2.

TABLE 2

| Prerequisite | Event | Response | Return button setting |
|---|---|---|---|
| Motionlapse mode | The gimbal is tilted | Stop the video recording and switch to normal recording mode | Press: shutter; Press and hold: switch mode |
| Hyperlapse mode | The gimbal is tilted | Stop the video recording and switch to normal recording mode | |
| Timelapse mode | The gimbal is tilted | | |
| SlowMotion mode | The gimbal is tilted | | |
| normal video recording | The gimbal is tilted | | |
| single photo capturing | The gimbal is tilted | | |
| AEB mode | The gimbal is tilted | | |
| countdown photo capturing mode | The gimbal is tilted | | |
| panoramic photo capturing mode | The gimbal is tilted | Stop the photographing and switch to normal recording mode | |

The return button in Table 2 can refer to the second control button 2 described above. As shown in Table 2, if the photographing apparatus is tilted in the Motionlapse mode, the Hyperlapse mode, or the panorama mode, the photographing mode is switched to the normal mode.

It should be noted that although the control operations involved in the photographing apparatus control method of the present disclosure are described above in a specific order, it is not required or implied that these control operations must be performed in that specific order, or that all of the control steps shown must be performed to achieve the desired result. In addition or alternatively, some control operation steps may be omitted, more than one control operation steps may be performed as a set of steps, and/or one control operation step may be performed as more than one control operations.

In the embodiments of the present disclosure, there is also provided a computer-readable storage medium storing a program product capable of implementing the above method of the present specification. In some embodiments, various aspects of the present disclosure can also be implemented in the form of a program product that includes program code. When the program product is run on a terminal device, the program code is used to enable the terminal device to implement the steps according to the embodiment methods of the present disclosure described above in this specification.

Figure 49:
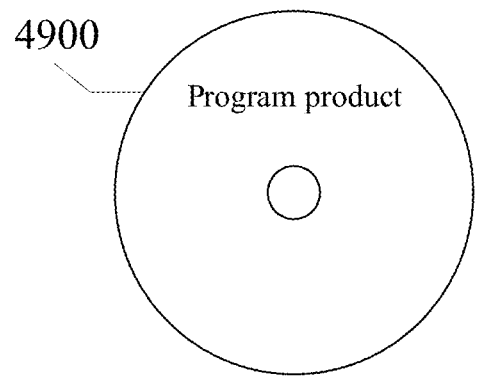
FIG. 49 is a schematic diagram of a storage medium according to one embodiment of the present disclosure.

As shown in FIG. 49, a program product 4900 for implementing the methods according to the embodiments of the present disclosure is provided, which, in the example shown in FIG. 49, adopts the form of a portable compact disk read-only memory (CD-ROM) and includes the program code that can be run on a terminal device, e.g., a personal computer. The program product is not limited thereto. The readable storage medium may be any tangible medium containing or storing a program, and the program may be used by or in combination with an instruction execution system, a device, or a component.

The program product may use any combination of one or more readable media. The readable medium may include a readable signal medium or a readable storage medium. The readable storage medium may include, but not limited to, an electronic, magnetic, optical, electromagnetic, infrared, or semiconductor system, device, or component, or any combination thereof. A more specific example (non-exhaustive list) of computer-readable media can include, electrical connection (electronic device) with one or more wires, portable computer disk, hard disk, random access memory (RAM), read-only memory (ROM), erasable and programmable read-only memory (EPROM), fiber optic devices, portable compact disc read-only memory (CD-ROM), optical storage device, magnetic storage device, or any suitable combination of the foregoing.

The computer-readable signal medium may be a data signal that is included in baseband or propagated as part of a carrier wave, which carries readable program code. The propagated data signal can adopt many forms including but not limited to an electromagnetic signal, an optical signal, or any suitable combination of the foregoing. The readable signal medium may also be any readable medium other than a readable storage medium, and the readable medium can send, propagate, or transmit a program for use by or in connection with an instruction execution system, device, or component.

The program code contained in the readable medium may be transmitted using any appropriate medium, including but not limited to wireless, cable, optical fiber cable, RF, etc., or any suitable combination of the foregoing.

The program code for performing the operations of the present disclosure can be written in any combination of one or more programming languages, which includes an object-oriented programming language, e.g., Java, C++, etc., and a conventional procedural programming language, e.g., C language or similar programming language. The program code may be executed entirely on an user computing device, partly on an user device, as an independent software package, partly on the user computing device and partly on an remote computing device, or entirely on the remote computing device or a server. The remote computing device may be connected to the user computing device through any kind of network including a local area network (LAN) or a wide area network (WAN), or it may be connected to an external computing device, e.g., using an Internet service provider to connect via the Internet.

Figure 50:
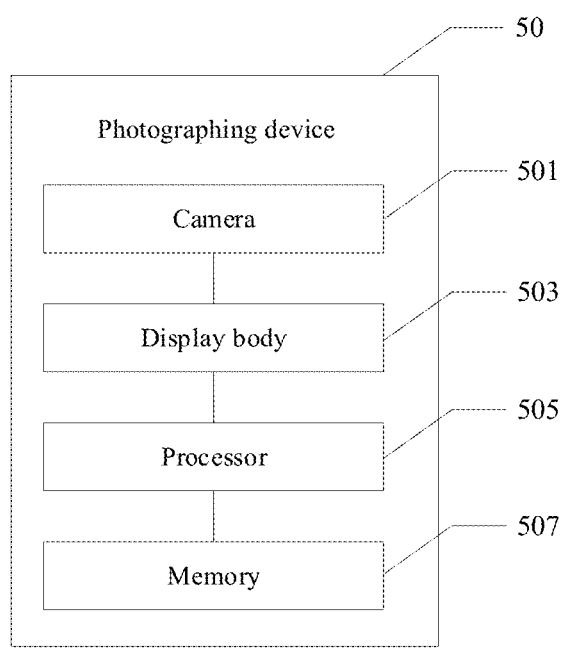
FIG. 50 is a block diagram of a photographing apparatus according to one embodiment of the present disclosure.

In an embodiment of the present disclosure, there is also provided a photographing apparatus capable of implementing the method described above. As shown in FIG. 50, the photographing apparatus 50 includes a camera 501, a display body 503, a processor 505, and a memory 507. The camera 501 is configured to acquire an image. The display body 503 with a display screen is configured to display a camera screen. The memory 507 is configured to store instructions that can be executed by the processor 505. The processor 505 may be configured to perform the above described photographing apparatus control method by executing executable instructions.

In the embodiments of the present disclosure, a control by physical buttons is not needed, and the user can perform the display interface switching only by sliding operation, which is simple and convenient. Further, since the number of physical buttons on the camera can be reduced, the method helps to miniaturize the camera for users to carry around.

According to the embodiments of the present disclosure, the photographing apparatus further includes a first control button that is disposed on the display body. When the first control button is pressed, the first control button can perform at least one of the operations of returning to the real-time framing interface, starting photographing, stopping photographing, or photographing using a default track and configuration.

According to the embodiments of the present disclosure, the photographing apparatus further includes a second control button that is disposed on the display body. When the second control button is pressed, the second control button can perform at least one of the operations of returning to returning to the real-time framing interface, returning to the previous operation interface, trigger, returning to the position setting interface and clearing all set positions, starting photographing, or stopping photographing.

According to the embodiments of the present disclosure, the photographing apparatus can further include a gimbal that is configured to support the camera and drive the camera to rotate around at least one axis. The gimbal can communicate with the display body.

The processor 505 can implement the steps according to the embodiment methods of the present disclosure described in this specification. For example, the processor 505 may perform S10 and S12 shown in FIG. 1.

The memory 507 may include a readable medium in the form of a volatile memory unit, e.g., a random access memory (RAM), and/or a cache memory unit, and may further include a read-only memory (ROM). The storage unit 507 may also include a set of (at least one) program modules and programs/utilities. The program module includes, but is not limited to, an operation system, one or more application programs, other program modules, and program data.

The drawings described are merely schematic illustrations of processes included in the method according to the embodiments of the present disclosure, and are not limited. The processes shown in the drawings do not indicate or limit the chronological order of the processes, and can be performed synchronously or asynchronously in more than one modules.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. A method for controlling a photographing apparatus with a display screen and a gimbal, comprising:
   detecting a sliding operation on the display screen; and
   switching a display interface in response to the sliding operation, including:
      switching, in response to the sliding operation being a first operation mode, the display interface to a photographing mode setting interface;
      switching, in response to the sliding operation being a second operation mode, the display interface to a photographing function setting interface; and
      switching, in response to the sliding operation being a third operation mode, the display interface to a playback control interface;
   wherein:
      the display interface includes a first control button and a second control button; and
      in response to the photographing apparatus being configured to be in a Timelapse mode and a mode sub-item of the Timelapse mode being switched to a custom mode, on a mode sub-item switching interface of the Timelapse mode, each of functions of the first control button and the second control button includes returning to a real-time framing interface and performing photographing according to a default track and configuration in response to a pressing operation on a shutter.

2. The method of claim 1, wherein the photographing function setting interface includes at least one of a tracking switch control, a display of power, a display of capacity, a gimbal setting control, a general setting control, or an other-parameter setting control.

3. The method of claim 1, wherein a photographing mode corresponding to the photographing mode setting interface includes at least one of normal video recording mode, panorama mode, the Timelapse mode, SlowMotion mode, or single photo capturing mode.

4. The method of claim 3, further comprising:
   controlling the photographing apparatus to be in the Timelapse mode; and
   in response to a selection of a custom mode, switching the display interface to a custom parameter setting interface configured to receive setting of a custom parameter, the custom parameter includes a time interval and a duration.

5. The method of claim 1, further comprising:
   in response to a user operation on the photographing function setting interface, modifying at least one of gimbal setting, general setting, or other function setting.

6. The method of claim 5, wherein on a gimbal setting interface, an object for setting includes at least one of whether the pitch axis is locked, a fast setting level, a joystick response direction, a vertical joystick operation direction, a horizontal joystick operation direction, gimbal leveling, or an automatic calibration of the gimbal.

7. The method of claim 5, wherein on a general setting interface, an object for setting includes at least one of whether to enable an airplane mode, a screen brightness, an automatic screen off time, whether to enable intelligent voice, a voice language type, a photographing setting, a photographing anti-flicker parameter, video encoding, a video system, a storage, formatting SD card, or a camera language.

8. The method of claim 5, wherein on an other-function setting interface, an object for inquiry includes at least one of battery information, activation information, copyright information, or MAC address, the other-function setting interface including a control for restoring factory settings.

9. The method of claim 1, further comprising:
   detecting a pressing operation on a control button of the photographing apparatus; and
   performing, in response to the pressing operation, at least one of an operation of returning to the real-time framing interface, an operation of starting photographing, an operation of stopping photographing, or an operation of photographing using a default track and configuration.

10. The method of claim 1, wherein the photographing apparatus is configured to be in the Timelapse mode that includes mode sub-items of a preset mode and a custom mode.

11. The method of claim 10, further comprising:
    in response to a mode sub-item of the Timelapse mode being switched to the preset mode, determining whether a current shutter speed is greater than a preset shutter speed;
    in response to the shutter speed being not greater than the preset shutter speed, switching the display interface to a Timelapse preset photographing interface in response to a click operation on a mode sub-item switching area, wherein on the Timelapse preset photographing interface, the function of the first control button includes starting photographing and the second control button functions as a trigger; and
    during photographing, the function of the first control button includes stopping photographing and the second control button functions as the trigger.

12. The method of claim 1, further comprising:
    setting a custom parameter and/or confirming photographing in the custom mode.

13. The method of claim 12, wherein setting the custom parameter includes:
    switching the display interface to a custom parameter setting interface to set the custom parameter in response to a click operation in the mode sub-item switching area, wherein on the custom parameter setting interface:
       the function of the first control button includes returning to the real-time framing interface and performing photographing according to the default track and configuration in response to the pressing operation on the shutter, and
       the function of the second control button includes returning to the photographing mode setting interface.

14. The method of claim 12, wherein:
    confirming photographing includes switching the display interface to a photographing confirmation interface after receiving a custom setting parameter, and starting photographing in response to a confirmation operation, wherein on the photographing confirmation interface, the function of the first control button includes starting photographing and the second control functions as a trigger; and
    during photographing, the function of the first control button includes stopping photographing and the second control button functions as the trigger.

15. The method of claim 1, wherein:
wherein the display interface includes a real-time framing interface of the photographing apparatus;
the method further comprising:
displaying a tracking frame or a metering-focusing frame in response to a half-press shutter operation in a photographing mode.

16. The method of claim 15, further comprising:
displaying the metering-focusing frame in response to a click operation on the real-time framing interface when a tracking function is off;
reducing a transparency of the metering-focusing frame after a first predetermined time; and
controlling the metering-focusing frame to disappear in response to an exposure value changing by more than 1 or after a second predetermined time.

17. The method of claim 16, further comprising:
locking the metering-focusing frame and displaying a lock mark in response to an operation of pressing and holding a lock control, and reducing a transparency of the lock mark after a third predetermined time; and/or
unlocking the metering-focusing frame in response to an operation of clicking on an area other than the metering-focusing frame on the real-time framing interface.

18. The method of claim 1, wherein a photographing apparatus parameter includes one or more of switching between manual mode and automatic mode, exposure compensation, shutter speed, photosensitivity, photo aspect ratio, video resolution and frame rate, white balance, high dynamic range (HDR), photo format, video format, peak focus, and enhancement mode.

19. A photographing apparatus comprising:
a camera configured to acquire images;
a display body including a display screen configured to display the images acquired by the camera;
a gimbal configured to support a camera and drive the camera to rotate around at least one axis, the gimbal being in communication with the display body;
a processor; and
a memory storing instructions that, when executed by the processor, cause the processor to:
detect a sliding operation on the display screen; and
switch a display interface in response to the sliding operation, including:
switching, in response to the sliding operation being a first operation mode, the display interface to a photographing mode setting interface;
switching, in response to the sliding operation being a second operation mode, the display interface to a photographing function setting interface; and
switching, in response to the sliding operation being a third operation mode, the display interface to a playback control interface;
wherein:
the display interface includes a first control button and a second control button; and
in response to the photographing apparatus being configured to be in a Timelapse mode and a mode sub-item of the Timelapse mode being switched to a custom mode, on a mode sub-item switching interface of the Timelapse mode, each of functions of the first control button and the second control button includes returning to a real-time framing interface and performing photographing according to a default track and configuration in response to a pressing operation on a shutter.

20. The method of claim 1,
wherein the photographing apparatus is configured to be in the Timelapse mode that includes mode sub-items including a preset mode and the custom mode;
the method further comprising:
in response to a mode sub-item of the Timelapse mode being switched to the preset mode, determining whether a current shutter speed is greater than a preset shutter speed; and
in response to the shutter speed being not greater than the preset shutter speed, switching the display interface to a Timelapse preset photographing interface in response to a click operation on a mode sub-item switching area.

* * * * *